US012726792B1

(12) United States Patent
Tenbuuren et al.

(10) Patent No.: US 12,726,792 B1
(45) Date of Patent: Sep. 1, 2026

(54) DYNAMIC CREATION AND MANAGEMENT OF LOCAL NETWORK EVENT FEEDS

(71) Applicant: DK Crown Holdings Inc., Boston, MA (US)

(72) Inventors: Aaron Tenbuuren, Jamaica Plain, MA (US); Sam MacGinty, Boston, MA (US); Brian Arthur Oddo, Somers, CT (US); Michael Legaz, New York, NY (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/330,151

(22) Filed: Sep. 16, 2025

(51) Int. Cl.

| | |
|---|---|
| ***H04L 7/00*** | (2006.01) |
| ***G06Q 50/34*** | (2012.01) |
| ***H04W 4/02*** | (2018.01) |
| ***H04W 4/029*** | (2018.01) |

(52) U.S. Cl.
CPC ............ *H04W 4/029* (2018.02); *G06Q 50/34* (2013.01); *H04W 4/023* (2013.01)

(58) Field of Classification Search
CPC ....... H04W 4/029; H04W 4/023; G06Q 50/34
USPC .......................................................... 375/354
See application file for complete search history.

(56) References Cited

U.S. PATENT DOCUMENTS

| | | | | |
|---|---|---|---|---|
| 8,982,935 | B2 * | 3/2015 | Subramanian | G01S 5/0289 455/456.6 |
| 9,031,957 | B2 * | 5/2015 | Agrawal | G06F 16/252 707/741 |
| 12,363,194 | B1 * | 7/2025 | Morris | H04L 41/22 |
| 2011/0276396 | A1 * | 11/2011 | Rathod | H04L 51/214 707/706 |
| 2014/0221071 | A1 * | 8/2014 | Calio | G07F 17/3225 463/31 |
| 2016/0234140 | A1 * | 8/2016 | Sirpal | H04N 21/812 |
| 2016/0277374 | A1 * | 9/2016 | Reid | H04L 63/0435 |
| 2020/0357246 | A1 * | 11/2020 | Nelson | G07F 17/323 |

* cited by examiner

*Primary Examiner* — Helene E Tayong
(74) *Attorney, Agent, or Firm* — Foley & Lardner LLP

(57) ABSTRACT

Systems and methods for managing network application feeds across multiple client devices are disclosed. A system can maintain a plurality of network application feeds, each associated with a respective client device and including a set of network data records. The system can receive, from an application on a first client device, information indicating that a second client device has requested access to the first device's network application feed via local network communication. Upon approval, the system updates the feed to include an identifier of the second device's profile and provides corresponding data records for presentation on the second device. The system can receive requests to generate additional data records, update the network application feed with such records and associated parameters, and provide indications of the additional data records for presentation on the first client device.

20 Claims, 12 Drawing Sheets

DYNAMIC CREATION AND MANAGEMENT OF LOCAL NETWORK EVENT FEEDS

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

At least one aspect relates to a system. The system can include one or more processors coupled to non-transitory memory. The system can maintain a plurality of network application feeds, each corresponding to a respective client device, where each network application feed includes a respective set of network data records. The system can receive, from an application executing on a first client device corresponding to a first network application feed, information indicative of a second client device requesting to access the first network application feed, where the first client device received the information in a local network communication from the second client device. The system can update the first network application feed to include an identifier of a profile associated with the second client device based on the first client device being approved to access the first network application feed. The system can provide, to the second client device for presentation in a first application interface, at least a portion of the respective set of network data records of the first network application feed. The system can receive, from the first client device, a request to generate a data record associated with a first set of network parameters. The system can update the respective set of network data records to include the data record and at least a subset of the first set of network parameters. The system can provide, to the first client device for presentation in a second application interface, an indication of the data record and the subset of the first set of network parameters.

In some implementations, the information comprises location information of the second client device. In some implementations, the system can determine that the second client device is within a threshold distance of a location associated with the first network application feed. In some implementations, the system can update the first network application feed to include the identifier of the profile associated with the second client device in response to determining that the second client device is within the threshold distance of the location associated with the first network application feed. In some implementations, the information is indicative of a local wireless network communication transmitted from the second client device to the first client device. In some implementations, the system can determine, based on a second signal from the first client device, that the second client device is no longer proximate to the first client device. In some implementations, the system can update the first network application feed to remove the identifier of the profile associated with the second client device.

In some implementations, the data record is a first data record. In some implementations, the system can receive, from the first client device, a request to generate a second data record corresponding to the first data record, where the second data record identifies a second set of network parameters. In some implementations, the system can update the respective set of network data records of the first network application feed to include the second data record and at least a portion of the second set of network parameters. In some implementations, the system can determine that the second client device is identified in the first network application feed. In some implementations, the system can provide, to the second client device for presentation in the first application interface, second data comprising at least a portion of the second set of network parameters of the second data record. In some implementations, the system can receive, from the first client device, a message identifying a notification type associated with the data record. In some implementations, the system can provide, to the second client device, data indicative of the notification type for presentation in connection with the data record via the first application interface.

In some implementations, the system can detect a change in a status of the data record. In some implementations, the system can provide, to the first client device, data indicative of the change in the status of the data record for presentation in the second application interface. In some implementations, the system can receive, from the first client device, a request to establish the first network application feed. In some implementations, the system can establish the first network application feed based at least on location information associated with the first client device. In some implementations, the system can identify, based on location information of the second client device, a subset of the plurality of network application feeds, where each network application feed of the subset is associated with a respective location within a threshold distance of the location information of the second client device. In some implementations, the system can provide, for presentation, the subset of the plurality of network application feeds.

At least one other aspect relates to a method. The method can be performed, for example, by one or more processors coupled to non-transitory memory. The method can include maintaining a plurality of network application feeds, each corresponding to a respective client device, where each network application feed includes a respective set of network data records. The method can include receiving, from an application executing on a first client device corresponding to a first network application feed, information indicative of a second client device requesting to access a first network application feed, where the first client device received the information in a local network communication from the second client device. The method can include updating the first network application feed to include an identifier of a profile associated with the second client device based on the first client device being approved to access the first network application feed. The method can include providing, to the second client device for presentation in a first application interface, at least a portion of the respective set of network data records of the first network application feed. The method can include receiving, from the first client device, a request to generate a data record associated with a first set of network parameters. The method can include updating the respective set of network data records to include the data record and at least a subset of the first set of network parameters. The method can include providing, to the first client device for presentation in a second application interface, an indication of the data record and the subset of the first set of network parameters.

In some implementations, the information comprises location information of the second client device. In some implementations, the method can include determining that the second client device is within a threshold distance of a location associated with the first network application feed. In some implementations, the method can include updating the first network application feed to include the identifier of the profile associated with the second client device in response to determining that the second client device is within the threshold distance of the location associated with the first network application feed. In some implementations, the information is indicative of a local wireless network communication transmitted from the second client device to the first client device. In some implementations, the method can include determining, based on a second signal from the first client device, that the second client device is no longer proximate to the first client device. In some implementations, the method can include updating the first network application feed to remove the identifier of the profile associated with the second client device.

In some implementations, the data record is a first data record. In some implementations, the method can include receiving, from the first client device, a request to generate a second data record corresponding to the first data record, where the second data record identifies a second set of network parameters. In some implementations, the method can include updating the respective set of network data records of the first network application feed to include the second data record and at least a portion of the second set of network parameters. In some implementations, the method can include determining that the second client device is identified in the first network application feed. In some implementations, the method can include providing, to the second client device for presentation in the first application interface, second data comprising at least a portion of the second set of network parameters of the second data record. In some implementations, the method can include receiving, from the first client device, a message identifying a notification type associated with the data record. In some implementations, the method can include providing, to the second client device, data indicative of the notification type for presentation in connection with the data record via the first application interface.

In some implementations, the method can include detecting a change in a status of the data record. In some implementations, the method can include providing, to the first client device, data indicative of the change in the status of the data record for presentation in the second application interface. In some implementations, the method can include receiving, from the first client device, a request to establish the first network application feed. In some implementations, the method can include establishing the first network application feed based at least on location information associated with the first client device. In some implementations, the method can include identifying, based on location information of the second client device, a subset of the plurality of network application feeds, where each network application feed of the subset is associated with a respective location within a threshold distance of the location information of the second client device. In some implementations, the method can include providing, for presentation, the subset of the plurality of network application feeds.

At least one aspect relates to a system. The system can receive, from a first client device corresponding to a network application feed, a request to provide a second client device access to the network application feed, the request comprising device information of the second client device and an indication that the second client device has communicated via a local network connection with the first client device. The system can update, based on the device information, a permission of the network application feed such that the second client device is permitted to access the network application feed. The system can provide a set of network data records of the network application feed to the second client device for presentation in an application interface. The system can receive, from the first client device, an indication that the second client device has disconnected from the local network connection with the first client device. The system can update, based on the indication, the permission of the network application feed such that the second client device is restricted from accessing the network application feed. The system can restrict presentation of the set of network data records of the network application feed at the second client device.

In some implementations, the local network connection comprises one or more of a wireless fidelity (WiFi) connection, a Bluetooth connection, or a near-field communication (NFC) connection. In some implementations, the indication identifies that the second client device has not communicated with the first client device via the local network connection within a predetermined time period. In some implementations, the system can update the set of network data records in response to information indicative of an interaction corresponding to a client device associated with the network feed. In some implementations, the system can receive, from the first client device or the second client device, a second indication that the second client device has reconnected to the local network connection. In some implementations, the system can update, based on the indication, the permission of the network application feed to permit the second client device to access the network application feed.

In some implementations, the system can determine, based on location information of the second client device, that the second client device is to be restricted from accessing the network application feed. In some implementations, the system can update, responsive to determining that the second client device is to be restricted from accessing the network application feed, the permission of the network application feed such that the second client device is restricted from accessing the network application feed. In some implementations, the device information comprises location information of the second client device, and the system can determine that the second client device is within a threshold distance of a location associated with the network application feed. In some implementations, the system can update the permission further based on the second client device being within the threshold distance of the location associated with the network application feed.

In some implementations, the indication that the second client device has disconnected from the local network connection indicates that the second client device has not communicated via the local network connection for a predetermined time period. In some implementations, the system can receive, from a third client device corresponding to a second network application feed, a second request to provide the second client device access to the second network application feed. In some implementations, the system can provide a second set of network data records of the second network application feed to the second client device for presentation in the application interface. In some implementations, the system can detect a change in a status of a data record of the set of data records. In some implementations, the system can provide, to the second client device, data indicative of the change in the status of the data record for presentation in the application interface.

At least one other aspect relates to a method. The method can be performed, for example, by one or more processors coupled to non-transitory memory. The method can include receiving, from a first client device corresponding to a network application feed, a request to provide a second client device access to the network application feed, the request comprising device information of the second client device and an indication that the second client device has communicated via a local network connection with the first client device. The method can include updating, based on the device information, a permission of the network application feed such that the second client device is permitted to access the network application feed. The method can include providing a set of network data records of the network application feed to the second client device for presentation in an application interface. The method can include receiving, from the first client device, an indication that the second client device has disconnected from the local network connection with the first client device. The method can include updating, based on the indication, the permission of the network application feed such that the second client device is restricted from accessing the network application feed. The method can include restricting presentation of the set of network data records of the network application feed at the second client device.

In some implementations, the local network connection comprises one or more of a WiFi connection, a Bluetooth connection, or an NFC connection. In some implementations, the indication identifies that the second client device has not communicated with the first client device via the local network connection within a predetermined time period. In some implementations, the method can include updating the set of network data records in response to information indicative of an interaction corresponding to a client device associated with the network feed. In some implementations, the method can include receiving, from the first client device or the second client device, a second indication that the second client device has reconnected to the local network connection. In some implementations, the method can include updating, based on the indication, the permission of the network application feed to permit the second client device to access the network application feed.

In some implementations, the method can include determining, based on location information of the second client device, that the second client device is to be restricted from accessing the network application feed. In some implementations, the method can include updating, responsive to determining that the second client device is to be restricted from accessing the network application feed, the permission of the network application feed such that the second client device is restricted from accessing the network application feed. In some implementations, the device information comprises location information of the second client device, and the method can include determining that the second client device is within a threshold distance of a location associated with the network application feed. In some implementations, the method can include updating the permission further based on the second client device being within the threshold distance of the location associated with the network application feed.

In some implementations, the indication that the second client device has disconnected from the local network connection indicates that the second client device has not communicated via the local network connection for a predetermined time period. In some implementations, the method can include receiving, from a third client device corresponding to a second network application feed, a second request to provide the second client device access to the second network application feed. In some implementations, the method can include providing a second set of network data records of the second network application feed to the second client device for presentation in the application interface. In some implementations, the method can include detecting a change in a status of a data record of the set of data records. In some implementations, the method can include providing to the second client device data indicative of the change in the status of the data record for presentation in the application interface.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
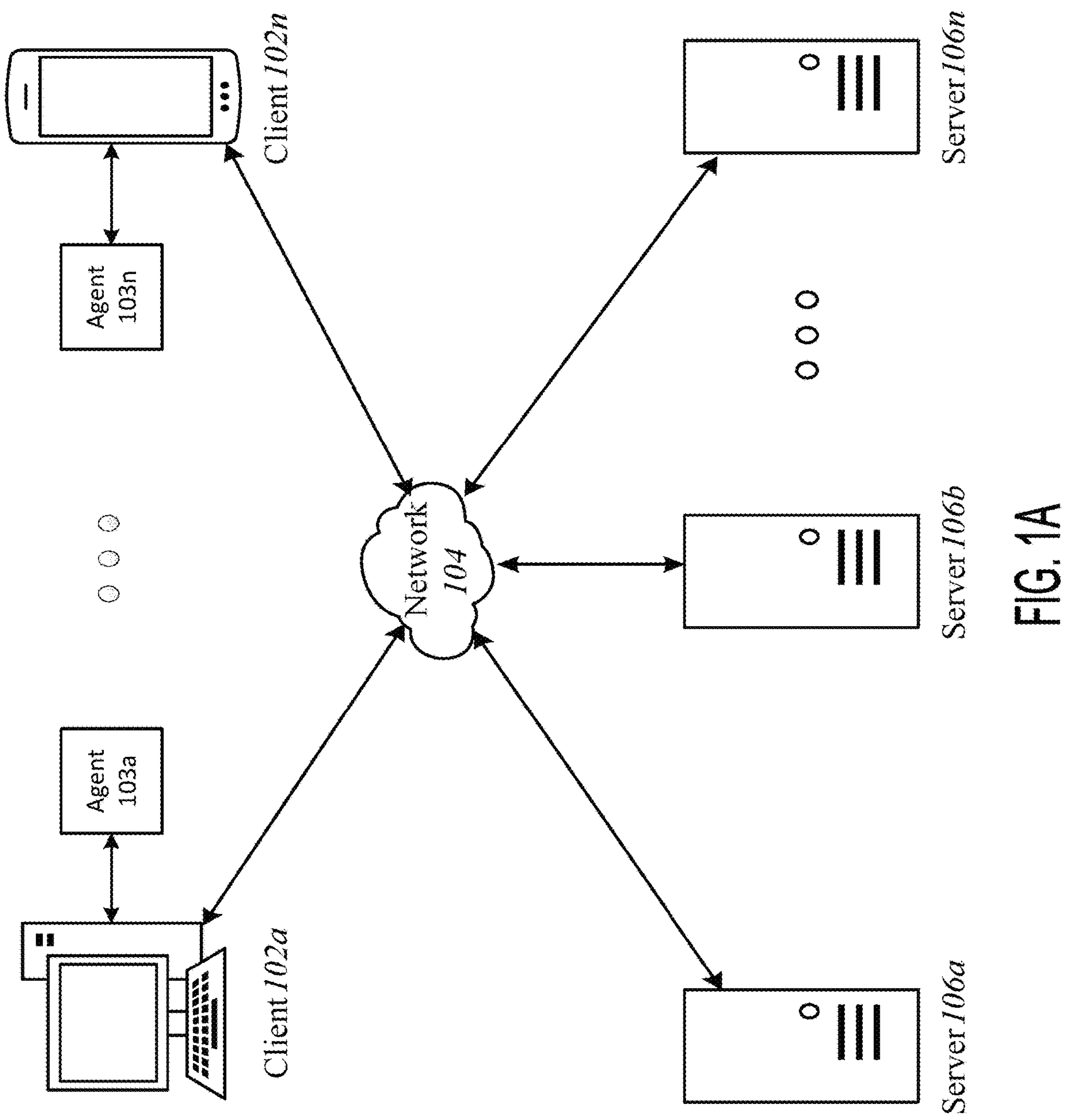
FIG. 1A is a block diagram depicting an embodiment of a network environment comprising a client device in communication with a server device.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

Networked application platforms can enable client devices to transmit and receive data records using various interfaces. In some implementations, such platforms can support access by individual client devices or by multiple client devices operating in a shared environment. Client devices can select network parameters, specify attributes for data records, or monitor updates to data records in real time or near real time. In some implementations, networked application platforms can support both remote and local device connectivity. Client devices can initiate data transmission or reception from a variety of locations, such as residential, commercial, or public network environments. The platforms can use network connectivity to synchronize application data. In some implementations, networked application platforms can include features for sharing data records among multiple client devices.

Conventional networked application platforms can lack support for multi-device connectivity, real-time synchronization, and user interface management across distributed client devices. Existing solutions fail to provide techniques for forming local device groups based on physical proximity and/or local network connections, while maintaining consistent state across all connected client devices. Such approaches also fail to implement application-level features due to data moderation challenges, which can include excessive data traffic, particularly in large-scale deployments. Current platforms also lack configurable privacy controls for client devices joining device groups.

The techniques described herein can address such technical challenges associated with multi-device connectivity, synchronization, privacy, and interface management in networked application platforms. The techniques described herein can use proximity-based detection, such as Bluetooth or other local network connections, to facilitate local device group formation and auto-rejoin functionality. The techniques described herein can implement real-time synchronization of distributed data records using server-based state management or WebSocket communication, in some implementations. The techniques described herein can address issues with data moderation by automatically imposing limits on application-level interactions in connection with network sessions/groups established using local network connections. Configurable privacy and anonymity settings can be provided for client devices joining public or location-based device groups. The techniques described herein can use automatic catch-up synchronization, such that session state can be restored for client devices reconnecting after disconnection. Collaborative data record creation can be supported with constraint settings and role-based access controls.

In some implementations, the techniques described herein can detect client devices via one or more local network connections and prompt such client devices to join local networked device groups. In some implementations, device whitelisting can be used to allow auto-rejoin based on persistent device identifiers. Real-time or near real-time updates can be provided to network members using server synchronization and/or WebSocket technology, among other approaches. In some implementations, distributed data records can be mirrored across all connected client devices via a data processing system. Privacy configuration settings can be used to enforce criteria related to group joining, rejoining, and/or data record synchronization. The techniques described herein can provide graphical user interfaces to present data records or session selection features.

In some implementations, administrators/owners/group creators can generate various constraints, such as maximum/minimum parameter ranges and/or record limits per client device. The present techniques can prevent automatic processing of data records outside preset boundaries, location criteria, and/or local network connection criteria. Various features can include client device removal, blocking, permission settings, and/or session locking capabilities, among others. In some implementations, client devices can establish connections to multiple concurrent network application feeds via one or more local network connections. The techniques described herein can provide technical improvements over existing approaches by enabling real-time or near real-time multi-device network operations in a manner that reduces data overhead while maintaining network session continuity across both local and remote client devices.

In various implementations, the systems and methods described herein can reduce computing processor and memory consumption during management of network application feeds and user permissions. For example, such approaches can maintain a permission data structure for each network application feed and can update access rights for client devices only when a connection or disconnection event is detected, rather than continuously polling or reprocessing the entire set of network data records. By updating permissions based on discrete device information and connectivity indications, and restricting presentation of network data records only when a client device is actively permitted, the present techniques can avoid execution of unnecessary operations and memory allocations for users who are not currently authorized. As a result, computing resources are conserved relative to conventional approaches, particularly in scenarios involving large numbers of client devices or frequent changes in group membership.

In some implementations, the present techniques can reduce network communication overhead associated with synchronizing group membership and data record access. For example, such approaches can provide network data records to a second client device only after a permission update confirms access, and may restrict further data transmission to that client device upon disconnection or loss of local network connectivity, as indicated by received indications from the first client device. By limiting the transmission of network data records and updates to only those client devices with active permissions, and by ceasing communication when a device is restricted, the present techniques can avoid redundant or unnecessary network traffic that would otherwise occur in conventional broadcast or polling-based architectures. As a result, overall network bandwidth consumption is reduced, allowing for more efficient operation in environments with limited or variable connectivity.

Referring to FIG. 1A, an embodiment of a network environment is depicted for managing network sessions of network applications. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
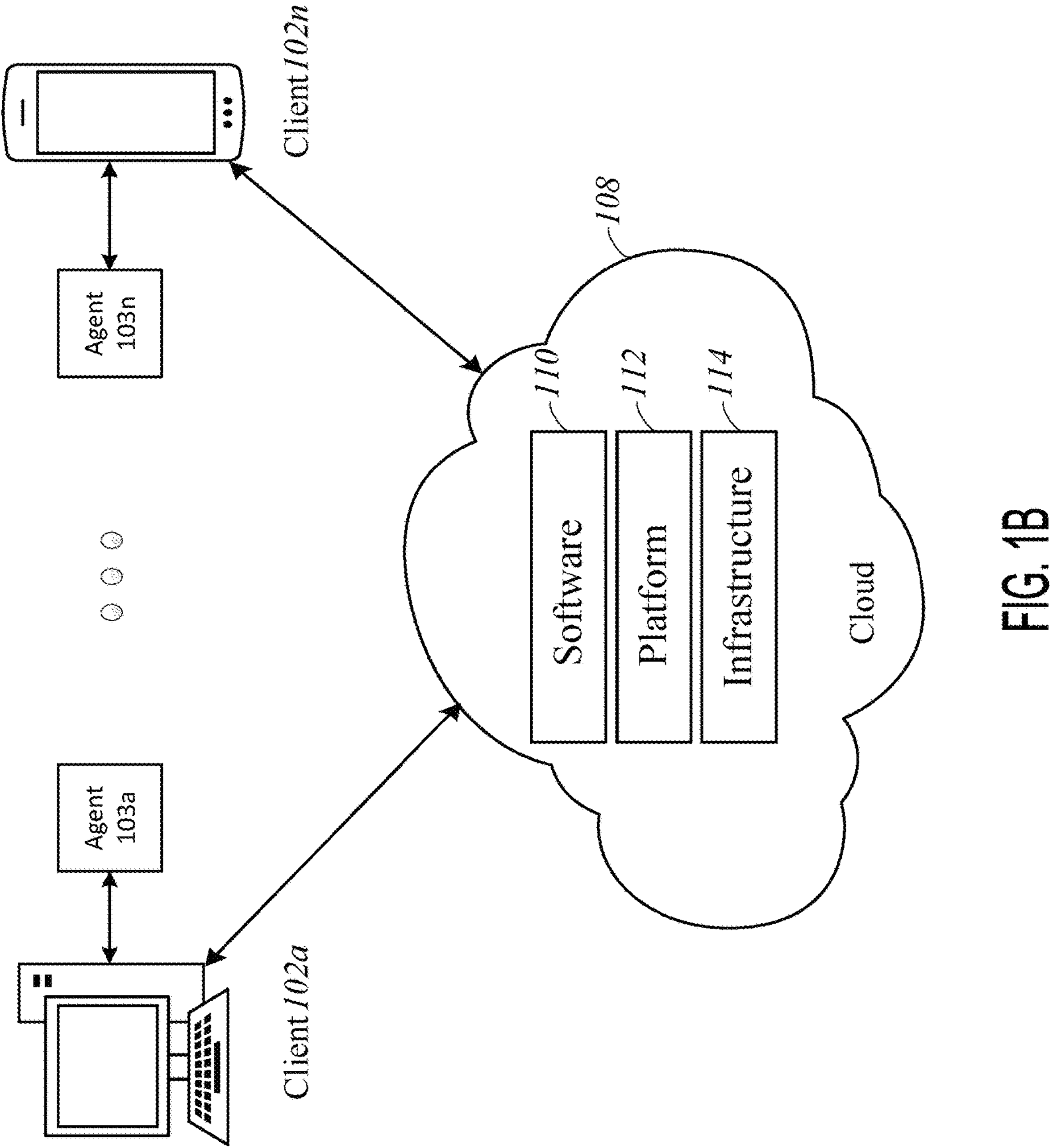
FIG. 1B is a block diagram depicting a cloud computing environment comprising a client device in communication with cloud service providers.

Referring to FIG. 1B, a cloud computing environment is depicted for managing network sessions of network applications. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
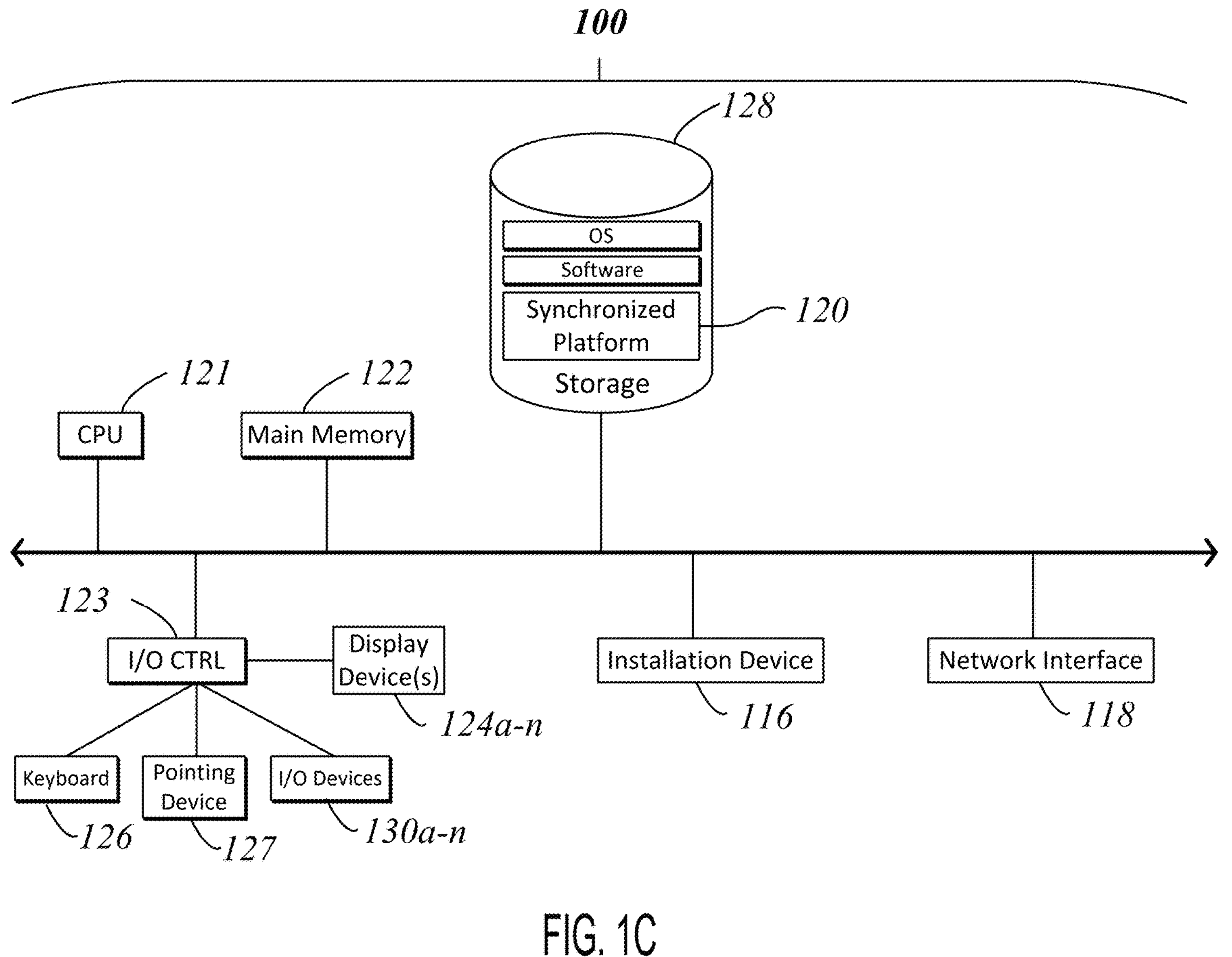
FIGS. 1C and 1D are block diagrams depicting embodiments of computing devices useful in connection with the methods and systems described herein.
Figure 1D:
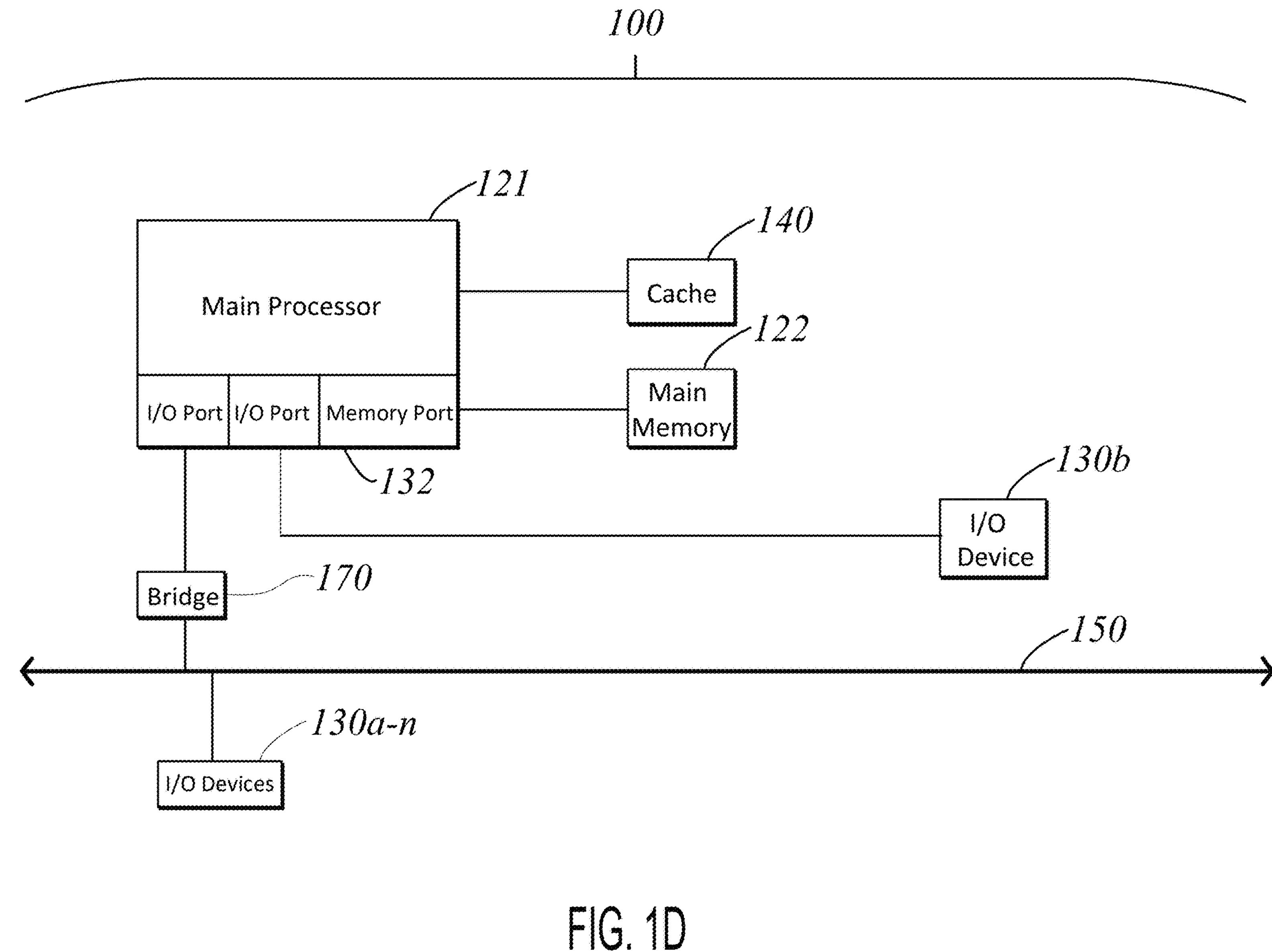

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for managing network sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a Fire Wire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 2:
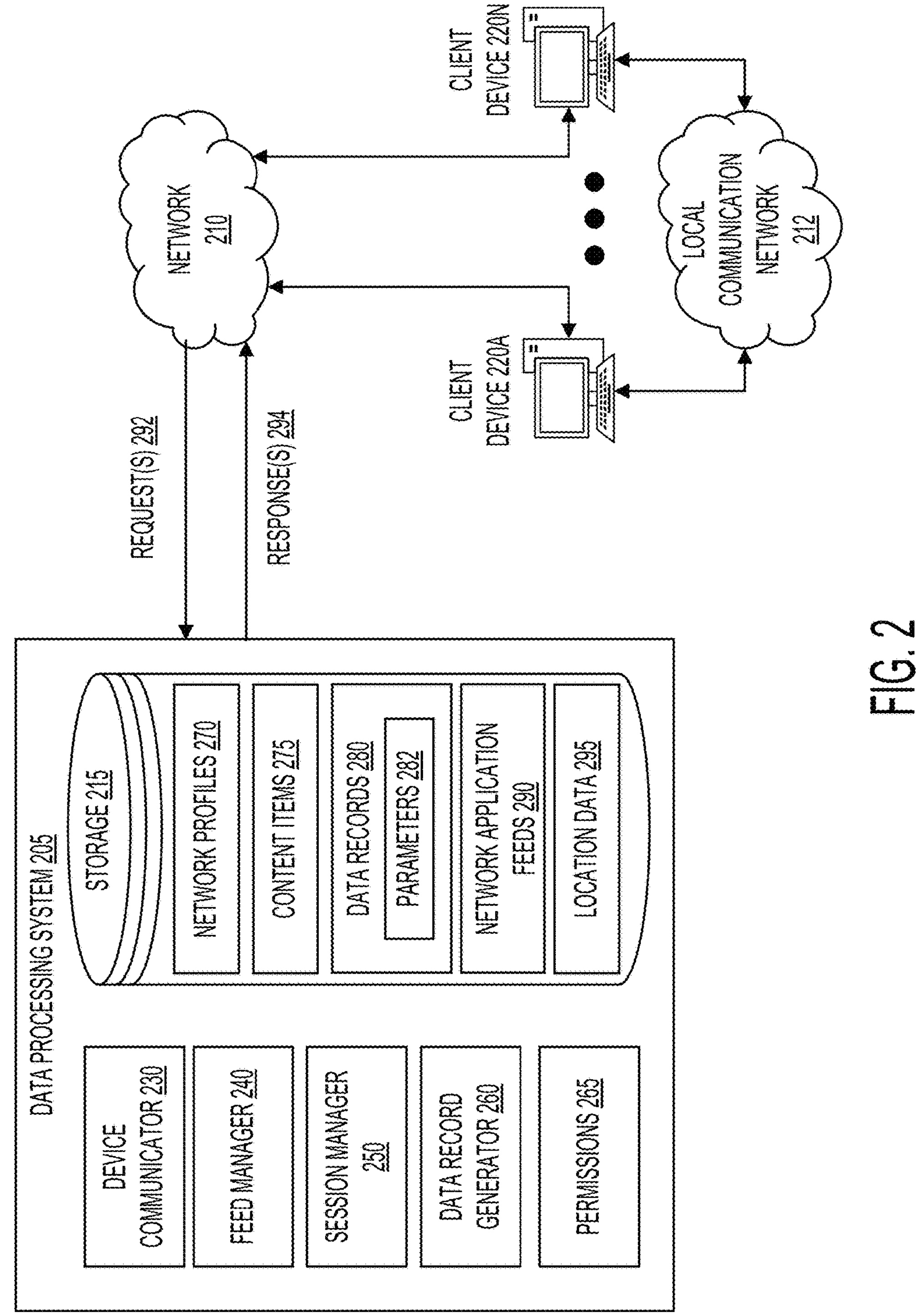
FIG. 2 illustrates a system for dynamic creation and management of local network event feeds, in accordance with one or more implementations.

Referring now to FIG. 2, illustrated is a block diagram of an example system 200 for dynamic creation and management of local network event feeds, in accordance with one or more implementations. The system 200 can include at least one data processing system 205, at least one network 210, one or more client devices 220A-220N (sometimes generally referred to as "client device(s) 220"), and at least one local communication network 212 (sometimes referred to herein as a "local network connection 212"). The data processing system 205 can include at least one device communicator 230, at least one feed manager 240, at least one session manager 250, at least one data record generator 260, one or more permissions 265, and at least one storage 215. The storage 215 can include one or more network profiles 270, one or more content items 275, one or more data records 280, one or more data record parameters 282, one or more network application feeds 290, and location data 295. The data processing system 205 can communicate with one or more client devices 220 via the network 210 by transmitting one or more requests 292 and receiving one or more responses 294.

Each of the components (e.g., the data processing system 205, the network 210, the storage 215, the client devices 220A-220N, the local communication network 212, the device communicator 230, the feed manager 240, the session manager 250, the data record generator 260, the permissions 265, the network profiles 270, the content items 275, the data records 280, the parameters 282, the network application feeds 290, the location data 295, the requests 292, the responses 294, components thereof, etc.) of the system 200 can be implemented using the hardware components or a combination of software with the hardware components of a computing system, such as the server 106, the client computing system 102, or the computing system 100 described in connection with FIGS. 1A-1D, or any other computing system described herein.

The system 200 can include at least one data processing system 205. The data processing system 205 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The system 200 can include at least one network 210. The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the server 106, the client computing system 102, the computing system 100, etc.) may also communicate wirelessly with the computing devices of the network 210 via a proxy device (e.g., a router, network switch, or gateway).

The system 200 can include one or more client devices 220A-220N. Each client device 220 can include at least one processor and a memory (e.g., a processing circuit). The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client device 220 can include one or more computing devices or servers that can perform various functions as described herein. The client device 220 can include any or all of the components and perform any or all of the functions of the client computing system 102 or the computing system 100 described in connection with FIGS. 1A-1D, or any other computing system described herein. The client device 220 may execute one or more applications (e.g., web-based applications, native applications, etc.) to perform any of the operations described herein. Although client devices 220A-220N are shown in FIG. 2, it should be understood that the system 200 may include any number of client devices 220 that may perform any of the operations described herein.

The system 200 is shown as including at least one local communication network 212. The local communication network 212 can include any network that supports direct or near-direct communication between client devices 220A-220N. In some implementations, the local communication network 212 can include a Bluetooth network, a near-field communication (NFC) network, or a wireless fidelity (WiFi) network, among others. The local communication network 212 can support peer-to-peer communication protocols, such as Bluetooth Low Energy (BLE) or WiFi Direct, among others, such that client devices 220A-220N can detect, identify, and/or exchange data with proximate devices. In some implementations, the local communication network 212 can support both unicast and broadcast communication modes, such that a client device 220A can transmit a message to a second client device 220 or to all client devices 220 within communication range. The local communication network 212 can operate independently of the network 210, or can supplement the network 210 by providing additional peer-to-peer communication channels for client devices 220A-220N.

In some implementations, the client devices 220A-220N can use the local communication network 212 to communicate with one another as described herein. The client devices 220A-220N can transmit requests, notifications, or data records using the local communication network 212. For example, a client device 220A can transmit a request to access a network application feed associated with a client device 220B by sending a message via the local communication network 212. The client device 220B can receive the request and respond by granting or denying access, or by transmitting additional information via the local communication network 212. In some implementations, the client devices 220A-220N can use the local communication network 212 to synchronize session state, exchange participant identifiers, or transmit updates regarding network data records. The local communication network 212 can support low-latency communication such that real-time or near real-time updates can be transmitted between client devices 220A-220N.

The client devices 220A-220N can host, access, or otherwise communicate via the local communication network 212 in a variety of ways. In some implementations, a client device 220A can initiate a local communication session by broadcasting a service advertisement or discovery message using Bluetooth, NFC, and/or WiFi protocols, among others. Other client devices 220B-220N proximate to the client device 220A can detect the advertisement and initiate a connection to the client device 220A via the local communication network 212. In some implementations, a client device 220A can act as a host or group owner, such that other client devices 220B-220N can join a local communication session/exchange (e.g., corresponding to a respective network application feed 290) by connecting to the client device 220A. The client devices 220A-220N can exchange authentication tokens, device identifiers, and/or session keys to establish secure communication channels via the local communication network 212. In some implementations, the client devices 220A-220N can maintain persistent connections or periodically re-establish connections to the local communication network 212 to support mobility scenarios, such as movement between locations or to track temporary or loss of connectivity. The client devices 220 can use the local communication network 212 to support auto-rejoin functionality and/or proximity-based access control as described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display various graphical user interfaces (e.g., graphical user interfaces 302A, 302B, 302C, 302D, 302E of FIGS. 3A-3E, etc.), as described herein. The display can include a touch screen displaying an application, such as the gaming applications described herein. The display can include a border region (e.g., side border, top border, bottom border).

In some implementations, the display can include a touch screen display, which can display graphical content. The display can receive interactions from a player. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that enables a player to interact with and/or select one or more actionable objects as described herein. For example, a touchscreen display can enable interaction with one or more visual indications provided through the display of each mobile (or client) device 220, and responsive to an interaction (e.g., select, click-on, touch, hover), the client device 220 can generate an indication identifying the interaction, the selection, or an indication to of a command, among others. The touchscreen display can depict graphical elements representing an action query and generate an indication of the action chosen by the player. In some implementations, interactions received at the client device 220 can cause the client device 220 and/or the application executing thereon to transmit one or more requests 292 as described in further detail herein.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a gaming application that communicates with the data processing system 205 to place wagers (e.g., generate data records 290), play games, access network application feeds 290, among other operations described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles 270, the content items 275, the data records 280, the parameters 282, the network application feeds 290, or the location data 295, stored and maintained at the storage 215, and/or any of the information stored in the local storage 229, the local dataset 252, the context attributes 254, or any other information maintained or stored at the client device 220. The application can generate one or more actionable objects, such as the actionable objects (e.g., interactive objects) described herein below in connection with FIGS. 3A-3E, to a user (sometimes referred to herein as a "player") through a client device 220. Such actionable objects can include player-selectable hyperlinks, buttons, graphics, videos, images, or any other type of user interface element that generate a signal that is processed by the application executing on the respective client device 220.

In some implementations, one or more client devices 220 can establish one or more network sessions with the data processing system 205. In some implementations, the one or more network sessions can each include a channel or connection between the data processing system 205 and the one or more client devices 220. In some implementations, the one or more client devices 220 can transmit a request to join a communication session of the network sessions. The network sessions can include the execution of a virtual application, in which one or more client devices 220 can interact via communications with the data processing system 205 according to protocol of the virtual application. The protocol of the virtual application can include, but are not limited to, rules and/or instructions associated with the virtual application (e.g., an interactive network application, an interactive game, etc.). The network session may be used to perform any of the operations described herein.

In some implementations, the one or more network sessions can be or include one or more application sessions (e.g., of the virtual application), an execution session, a desktop session, a hosted desktop session, a terminal services session, a browser session, a remote desktop session, a URL session and/or a remote application session, among others. Each network session can include encrypted and/or secure sessions, which can include an encrypted file, encrypted data or traffic. Each client device 220 can use the network session established with the data processing system 205 to carry out any of the functionalities described herein. For example, the application executing on each client device 220 can perform any of the client-side operations described herein, including displaying any of the user interfaces shown in FIGS. 3A-3E, or any other types of user interfaces described herein.

Each of the client devices 220 can be computing devices configured to communicate via the network 210 to access information resources, such as web pages via a web browser, or application resources via a native application executing on a client device 220. When accessing information resources (e.g., instructions/assets for displaying/presenting, modifying, or otherwise navigating graphical user interface(s), etc.) the client device 220 can execute instructions (e.g., embedded in the native applications, in the information resources, etc.) that cause the client devices 220 to display various application interfaces, such as the user interfaces described herein below in conjunction with FIGS. 3A-3E. The application interfaces can be, for example, application interfaces that present different types of image-based search results, or other types of interactive graphical user interfaces. In general, the graphical user interfaces may include various different types of interactive or non-interactive assets (e.g., images, video, animations, graphics, audio, etc.) that is presented to a user via the input/output interfaces of a client device 220.

In response to interactions with graphical user interface elements, the client devices 220A-220N can transmit requests 292 which can include any of the information described herein, such as network profile identifiers 270, network data records 280, parameter values 282, or other signals to the data processing system 205. Information transmitted by the client devices 220A-220N can advance the state of network application feed 290 management operations. Network application feed(s) 290 can be updated, for example, based on receiving interaction information, such as selection of network parameters 282, from a client device 220A-220N, as described in further detail herein. In some implementations, a client device 220A-220N can transmit a request 292 to access a network application feed 290 via the data processing system 205. The request 292 can include, for example, a request to access one or more data records 280 of a network application feed 290 or a request to join/access a network application feed 290, such as by including a network profile identifier 270 or a device identifier, among other operations. The request 292 can be transmitted as, or can include, a hypertext transfer protocol (HTTP or HTTPS) request message, a file transfer protocol message, an email message, a text message, or any other type of message that can be transmitted via the network 210, among others.

The data processing system 205 can include at least one storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-3E, etc.), or any other computing devices described herein.

The storage 215 can include one or more network profiles 270. Each network profile 270 can be associated with a user (sometimes referred to herein as a "player") of a client device 220. The network profiles 270 may sometimes be referred to herein as "player profiles 270". A network profile 270 of a player can be a user profile that includes information about the player and information about one or more of the client devices 220 used to access the data processing system 205 using the network profile 270. For example, identifiers of the network profile 270 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others.

The network profile 270 can store information about placed wagers (e.g., selected wager opportunities, data records 280) represented via associations with data records 280 and/or fantasy sports lineups that are provided/placed/selected by the player via requests 292 transmitted to the data processing system 205. The network profile 270 can store any information about the player, including a credit balance, wager information (e.g., an amount of a wager/side wager, a timestamp associated with a wager/side wager, a client device identifier of a client device 220 that was used to place the wager/side wager, etc.). The network profile 270 can store information about a client device 220 used to access the data processing system 205 such as an IP address, a MAC address, a GUID, a network profile name (e.g., the name of a user of the client device 220, etc.), device name, among others. For example, the network profile 270 can store location information determined based on interactions between each client device 220 and the data processing system 205. In some implementations, the network profile 270 can be created by the data processing system 205 in response to the network profile creation request transmitted by a client device 220. The network profile 270 creation request can include any of the network profile information described herein.

The storage 215 can include one or more content items 275. The content items 275 can include graphical elements, display instructions, and/or data structures containing information to be displayed for different data records 280, data record parameters 282, and/or other displayable content. In some implementations, the content items 275 can include visual representations of wager opportunities (e.g., data records 280), such as moneyline wagers, point spread wagers, over/under wagers, parlay wagers, or prop bets. The content items 275 can include display data/content for fantasy sports contest entries, athlete statistics, team logos, event schedules, venue information, or league standings, among others. The content items 275 may be provided to represent entries/events in network application feeds 290, such as indications of members joining the feed, members leaving the feed, successful wager opportunities, unsuccessful wager opportunities, tailed wager opportunities (as described in further detail herein), or any other event/feed entry described herein. The content items 275 may include user interface elements (or display instructions corresponding thereto) that can be transmitted to the client device 220 for presentation via one or more graphical user interfaces, such as the graphical user interfaces 302C and 302D of FIGS. 3C and 3D, among others.

The storage 215 can include one or more data records 280. The data records 280 may include one or more wager opportunities with one or more associated wager parameters (e.g., data record parameters 282). In some implementations, the data records 280 can include placed wagers (e.g., wager opportunities selected by players), which can be associated with corresponding network profiles 270 of the players. Each data record 280 can represent a placed wager or a wager opportunity corresponding to a corresponding live event (e.g., a sporting event currently being played, an upcoming sporting event that has not yet started, etc.). The data records 280 can store or otherwise be associated with data record parameters 282, which can include information about each placed wager or wager opportunity, such as the associated live event(s), the type of wager/wager opportunity, and/or the outcome selected or possible outcomes for the wager opportunity. For example, a data record 280 can include a wager placed on a football game between Team A and Team B, with the player selecting Team A to win. In another example, a data record 280 corresponding to a wager opportunity may identity football game, and include data record parameters 282 providing possible selectable outcomes for Team A or Team B. The data record parameters 282 can also include additional information such as the date and time the wager was placed, the odds at the time of placement or current odds of the wager opportunity, and any conditions applied to the wager. In some implementations, the data record parameters 282 can specify the type of the wager or wager opportunity, such as moneyline wagers, point spread wagers, over/under wagers, parlay wagers, prop bets, or futures wagers, among others. The data records 280 may include multiple wager opportunities, such as selections of multiple outcomes for a tournament bracket or similar combination of selections for wager(s) having multiple outcomes (e.g., parlay wagers, exotic wagers, progressive parlay wagers, etc.).

In some implementations, odds associated with the wager opportunities of data records 280 can be dynamically adjusted based on various factors, such as live event data or changes in betting volume, among others. In some implementations, changes in the state of live events may cause, the data processing system 205 can recalculate and adjust wager odds for affected wager opportunities. In some implementations, the data processing system 205 can track the popularity of specific wager types or specific wager opportunities, such as straight bet wagers, same-game parlay (SGP) wagers, exotic wagers, or proposition wagers, among others. The data processing system 205 can track the number of times the corresponding wager types or wager opportunities have been selected. For example, each wager opportunity in the wager opportunities can include or be associated with a counter that is incremented each time the wager opportunity is placed by a player via the data processing system 205. In some implementations, the counter can be displayed as part of the content items 275 corresponding to one or more wager opportunities of the wager opportunities.

The storage 215 can include one or more parameters 282. The data record parameters 282 associated with these wagers/wager opportunities can include various attributes that define the characteristics of the placed wager or wager opportunity. For example, the data record parameters 282 can include the amount wagered by the player and/or possible wagering limits for wager opportunities, which can be stored as a numerical value representing the stake in a specified currency. The data record parameters 282 can also include the specific wager selections made by the player or possible outcome selections for wager opportunities, such as the team or athlete chosen in a moneyline bet, the point spread selected in a spread bet, or the combination of selections in a parlay wager. In some implementations, the data record parameters 282 can include odds values associated with each selection or possible selection, which can be represented in various formats such as decimal odds, fractional odds, or American odds notation. The data record parameters 282 can include timestamp information indicating when the wager was placed, when the wager opportunity expires, and/or when the odds were last updated. In some implementations, the data record parameters 282 can include status indicators showing whether a wager is active, settled, or pending resolution, or whether the wager opportunity is still available to wager on. The data record parameters 282 can include potential payout calculations that determine the return if one or more selected outcomes of the wager is successful. The data processing system 205 can use these data record parameters 282 to manage, process, place, or otherwise display wagers, update player balances, and/or provide accurate information to players about their active and past wagers or available wager opportunities.

The data records 280 can be stored within the storage 215 according to any suitable format or hierarchy. In some implementations, the data records 280 can be indexed by according to the identifier of the corresponding network profile 270 of the player. In some implementations, one or more of the data records 280 representing wager opportunities can be indexed by wager opportunity identifier, semantic content information, or other attributes of the wager opportunities. In some implementations, the data records 280 can be categorized by sport type, league, or competition. The data processing system 205 can maintain historical data records 280 for completed wagers, and may store indications of the current status of each data record (e.g., open, closed, etc.). In some implementations, the data records 280 can include references to specific content items 275 and/or network application feeds 290 that were presented to the player when a corresponding wager was placed or when a corresponding wager opportunity was provided to a client device 220. The data records 280 can be accessed by any of the components of the data processing system 102 to perform various operations, such as wager opportunities, placing wagers, updating wager statuses, or calculating payouts for successful wagers, among others.

The storage 215 can include one or more network application feeds 290. In some implementations, the network application feeds 290 can represent feeds of content items corresponding to data records 280, such as wagers, user actions, or other event records, which can be placed or generated by members of the respective network application feed 290. The network application feeds 290 can be structured to maintain a chronological list of activities, such as user join events, wagers placed, user leave events, or other relevant actions, among others. In some implementations, each network application feed 290 can be associated with a particular group of network profiles 270 or client devices 220, such that approved or authorized network profiles 270 or client devices 220 can access, view, or interact with the content items or data records 280 within the corresponding network application feed 290. The association between network application feeds 290 and network profiles 270 or client devices 220 can be maintained using permissions 265, which can be stored in the storage 215 and referenced by the data processing system 205 during access control operations. The network application feeds 290 may be, or may sometimes be referred to as, "groups," with group membership specified or otherwise maintained in one or more corresponding permissions 265.

In some implementations, the network application feeds 290 can be established by a client device 220 transmitting a request 292 to the data processing system 205. The request 292 can include information identifying the client device 220, a network profile 270, or one or more parameters for the network application feed 290, such as a feed name, privacy setting, or initial membership criteria, among others. Upon receiving the request 292, the data processing system 205 can establish the network application feed 290 based on the information included in the request 292. In some implementations, the data processing system 205 can generate or update permissions 265 for the network application feed 290 to indicate the client device 220 or the network profile 270 as a host or owner of the network application feed 290. The permissions 265 can specify access rights, modification privileges, and/or administrative controls for the network application feed 290. In some implementations, the data processing system 205 can store the association between the client device 220 or the network profile 270 and the network application feed 290 in the storage 215. The data processing system 205 can provide a response to the client device 220 indicating the establishment of the network application feed 290 and the assignment of host or owner status.

In some implementations, a client device 220 can request to join a network application feed 290 by transmitting a request to a host client device 220 via the local communication network 212. The local communication network 212 can include a Bluetooth connection, a near-field communication connection, or a wireless fidelity connection, among others. The requesting client device 220 can transmit a join request message that includes a device identifier or a network profile identifier to the host client device 220. The host client device 220 can receive the join request message and can determine whether to approve or deny the request based on one or more criteria, such as whitelisting status or proximity. In response to approval, the host client device 220 can transmit an update to the data processing system 205 via the network 210. The update can include information identifying the requesting client device 220, such as the device identifier or network profile identifier, and can specify that permissions 265 associated with the network application feed 290 are to be updated to include the requesting client device 220 as an approved participant. The data processing system 205 can update the permissions 265 for the network application feed 290 in storage 215, such that the requesting client device 220 is granted access to the network application feed 290 and can receive content items 275 or data records 280 associated with the network application feed 290.

In some implementations, a client device 220 can request to join a network application feed 290 by communicating with a host client device 220 via the local communication network 212 to request access. The host client device 220 can provide an identifier or a token associated with the network application feed 290 to the requesting client device 220 using the local communication network 212. The identifier or token can include a unique feed identifier, a session token, or an access code, among others. The requesting client device 220 can use the received identifier or token to generate a request 292 to the data processing system 205 to join the network application feed 290. In some implementations, the requesting client device 220 can include the identifier or token within a data payload of the request 292. The request 292 can further include information identifying the requesting client device 220, such as a device identifier, a user profile identifier, or location data, among others. In response to receiving the request 292, the data processing system 205 can authenticate the identifier or token and determine whether the requesting client device 220 satisfies criteria for joining the network application feed 290. The data processing system 205 can update the network application feed 290 to include the requesting client device 220 as a participant based on successful authentication and criteria evaluation. The data processing system 205 can provide a response 294 to the requesting client device 220 indicating the result of the join request, such as approval or denial, and can transmit relevant data records 280 and/or session information associated with the network application feed 290 to the requesting client device 220 upon approval, as described herein.

The storage 215 is shown as including location data 295. In some implementations, the location data 295 can include location information provided by one or more client devices 220A-220N. The client devices 220A-220N can determine location information using one or more location determination technologies, such as Global Positioning System signals, Wi-Fi network triangulation, or Bluetooth proximity detection, among others. The client devices 220A-220N can transmit the location information to the data processing system 205 in association with a network application feed 290 or in response to a request from the data processing system 205. The data processing system 205 can receive the location information and store the location information as part of the location data 295 in the storage 215. The location information can include, for example, latitude and longitude coordinates, altitude values, and/or device-specific proximity metrics, among others.

In some implementations, the location data 295 can include location information associated with network application feeds 290. The data processing system 205 can generate or receive geofence definitions that specify a geographic boundary for a network application feed 290. The geofence definitions can be based on the location of a host client device 220 or on a predefined location associated with a group or event. The data processing system 205 can store the geofence definitions in the location data 295. The location data 295 can further include mappings between network application feeds 290 and corresponding geofence definitions or host device locations. The storage 215 can maintain historical location data, such as previous locations of client devices 220 and/or prior geofence boundaries, in association with timestamps or identifiers of sessions or network application feeds 290.

The permissions 265 can include access permissions associated with one or more network application feeds 290. In some implementations, the permissions 265 can define which client devices 220A-220N can access, modify, or view content within a particular network application feed 290. The permissions 265 can be generated by the data processing system 205 in response to receiving requests from client devices 220A-220N, such as when a user attempts to join a network application feed 290 or when an administrator modifies group membership. In some implementations, the permissions 265 can specify access levels, such as read-only, edit, or administrative privileges, for each client device 220A-220N associated with a network application feed 290. The permissions 265 can be determined based on criteria such as device identifiers, user profiles, group settings, or proximity information received from the client devices 220A-220N.

In some implementations, the permissions 265 can be provided to the data processing system 205 by an application executing on a client device 220A-220N or by an administrator through a management interface. The data processing system 205 can receive permission data as part of a network request, such as when a client device 220A-220N requests to join, leave, or modify participation in a network application feed 290. The permissions 265 can be stored in the storage 215 in association with corresponding network application feeds 290 and user or device identifiers. The data processing system 205 can update the permissions 265 in response to changes in group membership, device connectivity status, or administrative actions. In some implementations, the permissions 265 can be referenced by the feed manager 240 or the session manager 250 when determining whether to allow a client device 220A-220N to access or update (e.g., to add more data records 280 via placed wager(s), etc.) a network application feed 290.

In some implementations, the permissions 265 may include configuration settings for network profiles 270 that indicate whether placed wagers, such as executed data records 280, are to be included in network application feeds 290 in which the network profile 270 or the client device 220 is identified as a member, for example, via other permissions 265. The permissions 265 can store a flag, a preference value, or a privacy setting associated with each network profile 270 that specifies whether the corresponding placed wagers are to be broadcast or withheld from network application feeds 290. In some implementations, the data processing system 205 can reference the configuration settings stored in the permissions 265 when determining whether to update a network application feed 290 to include a data record 280 associated with a network profile 270 or a client device 220. In some implementations, the permissions 265 can be modified by a user via a client device 220 or by an administrator, such that the inclusion or exclusion of placed wagers in network application feeds 290 can be controlled according specified preferences.

Referring now to the functionality of the data processing system 205, the device communicator 230 can receive, from an application executing on a first client device 220 corresponding to (e.g., identified as an owner/administrator of) a network application feed 290, information indicative of a second client device 220 requesting to access the first network application feed 290. The information may be included in a request 292. In some implementations, the information was received by the first client device 220 in a local network communication from the second client device 220 via the local communication network 212.

Referring now to the data processing system 205, the device communicator 230 can receive, from a client device 220, a request 292 to establish a network application feed 290. In some implementations, the request 292 can include information identifying the client device 220, such as a device identifier, a user profile, or a session token, among others. The device communicator 230 can process the request 292 by extracting the included information and determining whether the client device 220 meets predefined criteria for network application feed 290 creation. In some implementations, the device communicator 230 can communicate with the feed manager 240 to initiate validation of the request 292. The validation can include checking for existing network application feeds 290 associated with the client device 220 and/or verifying that the client device 220 is within a permitted location or network environment.

In some implementations, the feed manager 240 can establish the network application feed 290 in response to successful validation of the request 292. The device communicator 230 can transmit a confirmation message, such as a response 294, to the client device 220 in response to the establishment of the network application feed 290 by the feed manager 240. The confirmation message can include an identifier for the established network application feed 290 or additional configuration parameters for subsequent interactions. The device communicator 230 can update the storage 215 to associate the network application feed 290 with the client device 220 or the corresponding network profile 270. The device communicator 230 can maintain a record of the request 292 and the resulting network application feed 290 in association with the client device 220 for future reference or management operations.

In some implementations, the device communicator 230 can receive a request 292 to delete/remove a network application feed 290 from a client device 220 that is identified as an owner or administrator of the network application feed 290. The request 292 can include an identifier of the network application feed 290 to be deleted or removed, and in some implementations, may include an authentication token or credential associated with the client device 220. The device communicator 230 can process the request 292 by verifying the ownership or administrative status of the client device 220 with respect to the network application feed 290. In response to successful verification, the device communicator 230 can transmit a signal to the feed manager 240 to initiate deletion or removal of the network application feed 290. In some implementations, the feed manager 240 can receive the signal from the device communicator 230 and can update the storage 215 to remove the network application feed 290 identified in the request 292. The feed manager 240 can delete all associations corresponding data records 280, parameters 282, and permissions 265 linked to the network application feed 290, in some implementations. In some implementations, such associations may be stored as historical data in the storage 215. In some implementations, the feed manager 240 can transmit a notification to all client devices 220 associated with the network application feed 290 (e.g., identified as current members and/or as accessing the network application feed 290), indicating that the network application feed 290 has been deleted or removed. The device communicator 230 can provide a response 294 to the client device 220 that submitted the request 292 to confirming completion of the deletion or removal operation.

In some implementations, the feed manager 240 can provide, for presentation in an application of one or more client devices 220 accessing functionality of the data processing system, one or more of the network application feeds 290 maintained by the data processing system. The feed manager 240 can provide the network application feeds 290 in response to a request from a client device 220. The request can include information identifying the client device 220, such as a device identifier, a user profile, or a location value (e.g., coordinates, location identifier, etc.), among others. In some implementations, the feed manager 240 can determine a subset of the network application feeds 290 that are available to be joined based on the location of the client device 220. The feed manager 240 can compare the received location value to stored location data 295 associated with each network application feed 290. The feed manager 240 can identify network application feeds 290 within a threshold distance of the client device 220, and can provide a list of such network application feeds 290 for presentation in the application interface of the client device 220.

In some implementations, the feed manager 240 can provide a list of network application feeds 290 that are associated with a corresponding identifier or token of the network application feed 290. The identifier or token can be received by a requesting client device 220 via the local communication network 212 and can be transmitted to the data processing system 205 in a request for network application feeds 290 that are available to be joined. In some implementations, the feed manager 240 can provide, for each network application feed 290, metadata relating to the network application feed 290. The metadata can include a feed identifier, such as a feed name, an identifier of an owner or administrator of the local feed, or location information of the local feed, among others. The feed manager 240 can transmit the metadata and the list of network application feeds 290 to the client device 220 for display in the application interface, such that the user of the client device 220 can select a network application feed 290 to join or request access.

The device communicator 230 can receive, from an application executing on a first client device 220 corresponding to (e.g., identified as an owner/administrator of) a first network application feed 290, information indicative of a second client device 220 requesting to access the first network application feed 290. The information can be received by the first client device 220 in a local network communication from the second client device 220 via the local communication network 212. In some implementations, the device communicator 230 can process the information to determine whether the second client device 220 is within a defined proximity of the first client device 220. For example, the device communicator 230 can extract a device identifier and/or a network profile 270 identifier from the information received from the second client device 220.

In some implementations, the device communicator 230 can initiate a verification process based on the information received from the second client device 220. The verification process can include determining whether the second client device 220 is authorized to access the first network application feed 290, for example, based on permissions 265 (e.g., the network profile 270 being blocked/allowed to access the first network application feed 290, etc.). In some implementations, the device communicator 230 can transmit a prompt and/or notification to the first client device 220 to approve or deny the access request from the second client device 220. The prompt may be presented via one or more graphical user interfaces. The first client device 220 can receive an interaction to approve or deny the second client device 220 access to the first network application feed 290, which can be transmitted to the data processing system 205 via the network.

In some implementations, the device communicator 230 can receive information comprising location information of the second client device 220. The device communicator 230 may process the received location information to determine a proximity between the second client device 220 a location of associated with one or more network application feeds 290 maintained by the data processing 205. In some implementations, the device communicator 230 can compare the received location information of the second client device 220 to stored location data 295 associated with the network application feeds 290. The device communicator 230 can determine whether the second client device 220 is within a threshold distance of a location associated with a particular network application feed 290. In response to determining that the second client device 220 is within the threshold distance, the device communicator 230 can generate a signal indicating that the second client device 220 is proximate to the location of the network application feed 290. The device communicator 230 can provide the proximity determination to the feed manager 240 or the session manager 250 for further processing, such as updating permissions or prompting the second client device 220 to join the network application feed 290.

In some implementations, the device communicator 230 can receive information indicative of a local wireless network communication transmitted from the second client device 220B to the first client device 220A via the local communication network 212. The device communicator 230 can process the received information to identify the source client device 220, the destination client device 220, and/or the communication protocol used, among others. The device communicator 230 can determine whether the received information includes a request for access to a network application feed 290, a device identifier, or location data 295 associated with the second client device 220. In response to receiving the information, the device communicator 230 can provide the information to the feed manager 240 or the session manager 250 for further processing. In some implementations, the device communicator 230 can store a record of the received communication in the storage 215, such as in association with the corresponding network profile 270 and/or network application feed 290.

The feed manager 240 can update the permissions 265 of the network application feed 290 to include an identifier of a network profile 270 associated with an owner/administrator client device 220 based on the requesting/joining client device 220 being approved to access the network application feed 290. In some implementations, and as described herein, the feed manager 240 can receive an approval signal from the owner/administrator client device 220 following a prompt generated in response to a join request from a second client device 220. The approval signal can include a device identifier and/or a network profile 270 identifier of the requesting/joining client device 220. In some implementations, the feed manager 240 can access the permissions 265 to determine whether the owner/administrator client device 220 is authorized to approve new participants for the network application feed 290. In response to a positive determination, the feed manager 240 can update the permissions 265 of the network application feed 290 by appending the identifier of the network profile 270 of the owner/administrator client device 220 to a membership list or access control data structure associated with the permissions 265 of the network application feed 290. For example, the feed manager 240 can store the identifier of the network profile 270 in a data structure that tracks active participants, such as a table, a list, or a database, among other data structures.

In some implementations, the feed manager 240 can update the permissions 265 of the network application feed 290 to reflect changes in feed/group membership in real-time or near real-time. For example, the feed manager 240 can transmit an update notification to one or more client devices 220 currently associated with the network application feed 290, such that each client device 220 can display an updated list of active participants/players/profiles or present a graphical notification of the added member. The feed manager 240 can log the addition of the identifier of the network profile 270 to a historical record or audit trail for the permissions 265 of the network application feed 290, which can include a timestamp, the approving client device 220 identifier, and the requesting/joining client device 220 identifier. In some implementations, the feed manager 240 can use the updated membership information in the permissions 265 to control access to subsequent data records 280 or content items 275 within the network application feed 290, such that client devices 220 associated with approved network profiles 270 can receive or interact with content items 275 presented via the network application feed 290. The feed manager 240 can access or reference the updated permissions 265 of the network application feed 290 when processing future join requests, changes to permissions 265, or group deletion/removal operations. In some implementations, the list of active participants of the network application feed 290 can be stored as part of the permissions 265 of the network application feed 290.

In some implementations, if a network application feed 290 is configured according to threshold distances from predetermined locations, the feed manager 240 can update the permissions 265 of the network application feed 290 to include an identifier of the network profile 270 of the joining client device 220 in response to determining that the joining client device 220 is within the threshold distance of the location associated with the first network application feed 290. Updated location information can be received from the second client device 220, such as latitude, longitude, or proximity data, among others. The feed manager 240 can compare the received location information to stored location data 295 associated with the network application feed 290. The feed manager 240 can determine whether the second client device 220 is within a predefined proximity threshold, which may be specified via a geofence boundary, in some implementations. The proximity threshold may be specified in configuration settings of the network application feed 290. In response to determining that the proximity threshold is satisfied, the feed manager 240 can update a membership list or access control data structure of the permissions 265 of the network application feed 290 to include the identifier of the profile 270 associated with the joining client device 220. The feed manager 240 can transmit an update notification to one or more client devices 220 associated with the first network application feed 290, such that the updated membership is reflected in real time or near real time.

The feed manager 240 may provide one or more interfaces to facilitate joining of network application feeds 290 that are proximate to a client device 220. For example, in some implementations, the feed manager 240 can identify, based on location information of a client device 220, a set of network application feeds 290 that are associated with a respective location that is within a threshold distance of the location information of the client device 220. In some implementations, the feed manager 240 can receive location information from the client device 220, such as latitude, longitude, or proximity data, among others. The feed manager 240 can compare the received location information to stored location data 295 associated with each network application feed 290. The feed manager 240 can determine whether any network application feed 290 is associated with a location that falls within a predetermined distance from the client device 220. In response to identifying one or more network application feeds 290 within the threshold distance, the feed manager 240 can generate, provide, or provide display instructions/data to populate an interface for presentation via the requesting client device 220.

In some implementations, the interface can include a selectable list of network application feeds 290, where each entry can include metadata such as a feed name, an owner identifier, or a location description, among others. In some implementations, the feed manager 240 can update the interface in real-time or near real-time as the location of the client device 220 changes or as new network application feeds 290 become available within the threshold distance. The feed manager 240 can receive a selection from the client device 220 to join a particular network application feed 290, and can initiate a join request process as described herein. The feed manager 240 can transmit a signal to the data processing system 205 to update permissions 265 or membership lists for the selected network application feed 290 in response to the join request. In some implementations, the feed manager 240 can provide feedback to the client device 220 regarding the status of the join request, such as approval, denial, or pending status, among others.

Client devices 220 can transmit a request to leave one or more network application feeds 290. In some implementations, the feed manager 240 can receive a leave request from a client device 220 and update a membership list or permissions 265 associated with the corresponding network application feed 290 to remove an identifier of the network profile 270 or device identifier of the client device 220. The feed manager 240 can transmit a notification to one or more remaining client devices 220 associated with the network application feed 290 to indicate that the client device 220 has left the network application feed 290. In some implementations, the feed manager 240 can update the storage 215 to reflect the change in membership and restrict access to content items 275 or data records 280 of the network application feed 290 for the client device 220 that has left. In some implementations, the session manager 250 can terminate any active session associated with the client device 220 in connection with the network application feed 290.

In some implementations, the feed manager 240 can update a network application feed 290 to remove the identifier of the network profile 270 associated with a client device 220 that has previously joined the network application feed 290 in response to determining that the joined client device 220 is no longer proximate to the client device 220 that is the owner/administrator of the network application feed 290. In some implementations, the feed manager 240 can receive a signal from the device communicator 230 indicating that the client device 220 is disconnected from the local communication network 212 or is located outside a defined proximity threshold. In some implementations, the feed manager 240 can access the location data 295 or the connectivity status information to confirm the proximity status of the client device 220. In some implementations, the feed manager 240 can update a membership list or an access control data structure associated with the network application feed 290 to remove the identifier of the network profile 270 associated with the client device 220. In some implementations, the feed manager 240 can transmit a notification to one or more client devices 220 associated with the network application feed 290 to indicate that the client device 220 is no longer an active participant in the network application feed 290. The feed manager 240 can update the permissions 265 or the access control settings to restrict the client device 220 from accessing the content items 275 or the data records 280 of the network application feed 290 after removal.

The feed manager 240 can provide, to a client device 220 that has joined a network application feed 290, for presentation in a first application interface (e.g., user interface 302C of FIG. 3C), at least a portion of the respective set of network data records 280 of the network application feed 290. For example, the feed manager 240 can provide the portion of the respective set of network data records 280 in response to a request from the client device 220 to access an interface of the network application feed 290. The portion of the respective set of network data records 280 can include a subset of information for each data record 280, where the subset can include one or more of odds, wager type, selected outcome, or status, among others. In some implementations, the subset can exclude certain information, such as wager amount or other sensitive data.

In some implementations, the feed manager 240 can represent the data records 280 in the first application interface as interactive elements. The interactive elements can enable the client device 220 to copy the data record 280 or provide one or more interactions with the data record 280 within the network application feed 290. In some implementations, the interactive elements can include selectable controls, such as buttons or icons, that can allow the client device 220 to initiate further actions, such as tailing a bet, sharing the data record 280, or displaying additional details associated with the data record 280. In some implementations, the interactive elements may facilitate commenting (e.g., with comments stored in association with the network application feed 290), reaction emojis, or other types of interactions.

The data record generator 260 can generate a data record 280 associated with a first set of network parameters 282 responsive to receiving a request from a client device 220. For example, the data record generator 260 can receive the request from the client device 220 via the network 210 and/or the local communication network 212. The data record generator 260 can extract data from the request, such as wager selections, odds values, or user identifiers, among others. The data record generator 260 can associate the data record 280 with the first set of network parameters 282 by storing the data record 280 and the first set of network parameters 282 in the storage 215. In some implementations, the data record generator 260 can generate a unique identifier for the data record 280 or associate the data record 280 with a network profile 270 of the client device 220. Generating the data record 280 may include confirming or executing a wager according to the network parameters 282 thereof.

The feed manager 240 can update the respective set of network data records 280 of one or more network application feeds 290 in which the client device 220 is identified as a member/participant/owner to include the generated data record 280 and at least a subset of the network parameters 282 thereof. In some implementations, the one or more network application feeds 290 can be updated in response to a request from the client device 220 to generate the data record 280 or in response to generating the data record 280 (e.g., executing/placing the wager, etc.). For example, the feed manager 240 can receive an indication from the data record generator 260 that the data record 280 has been generated.

The feed manager 240 can access the storage 215 to retrieve the respective set of network data records 280 associated with a network application feed 290. The feed manager 240 can append at least a portion of the data record 280 and the subset of the first set of network parameters 282 to the set of network data records 280 of the one or more network application feeds 290. In some implementations, the feed manager 240 can update metadata associated with the network application feed 290 to reflect the addition of the data record 280. The feed manager 240 can transmit an update notification/indication to one or more client devices 220 associated with the network application feed 290 to indicate that the data record 280 has been added. The data record 280 may be reflected in one or more interfaces of the network application feed 290, as shown in the example interface of FIG. 3C.

In some implementations, the device communicator 230 can receive, from a client device 220 that is a member/participant/owner of a network application feed 290, a message identifying a notification type associated with a data record 280 of a network application feed 290. The message may be provided in response to an interaction with one or more application interfaces displayed at the client device 220, as described herein. In some implementations, the notification type can correspond to an interaction type, where the interaction type can include a comment, an emoji reaction, a sharing interaction, or a tailing interaction, among others. In some implementations, the device communicator 230 can process the message to determine the interaction type and can update the network application feed 290 to include the interaction with the specified data record 280, as described herein.

In some implementations, the feed manager 240 can receive a request from the client device 220 to generate a second data record 280 corresponding to a first data record 280 included in the first network application feed 290. The request can be generated in response to a selection of an interactive element presented in association with the first data record 280 in the first network application feed 290. The interactive element can include a button, icon, or other selectable user interface component that is configured to initiate a tailing operation for the first data record 280. The request can specify that the client device 220 seeks to generate a second data record 280 that includes the same or similar network parameters 282 as the first data record 280, such as wager type, event selection, or odds, among others.

Figure 3A:
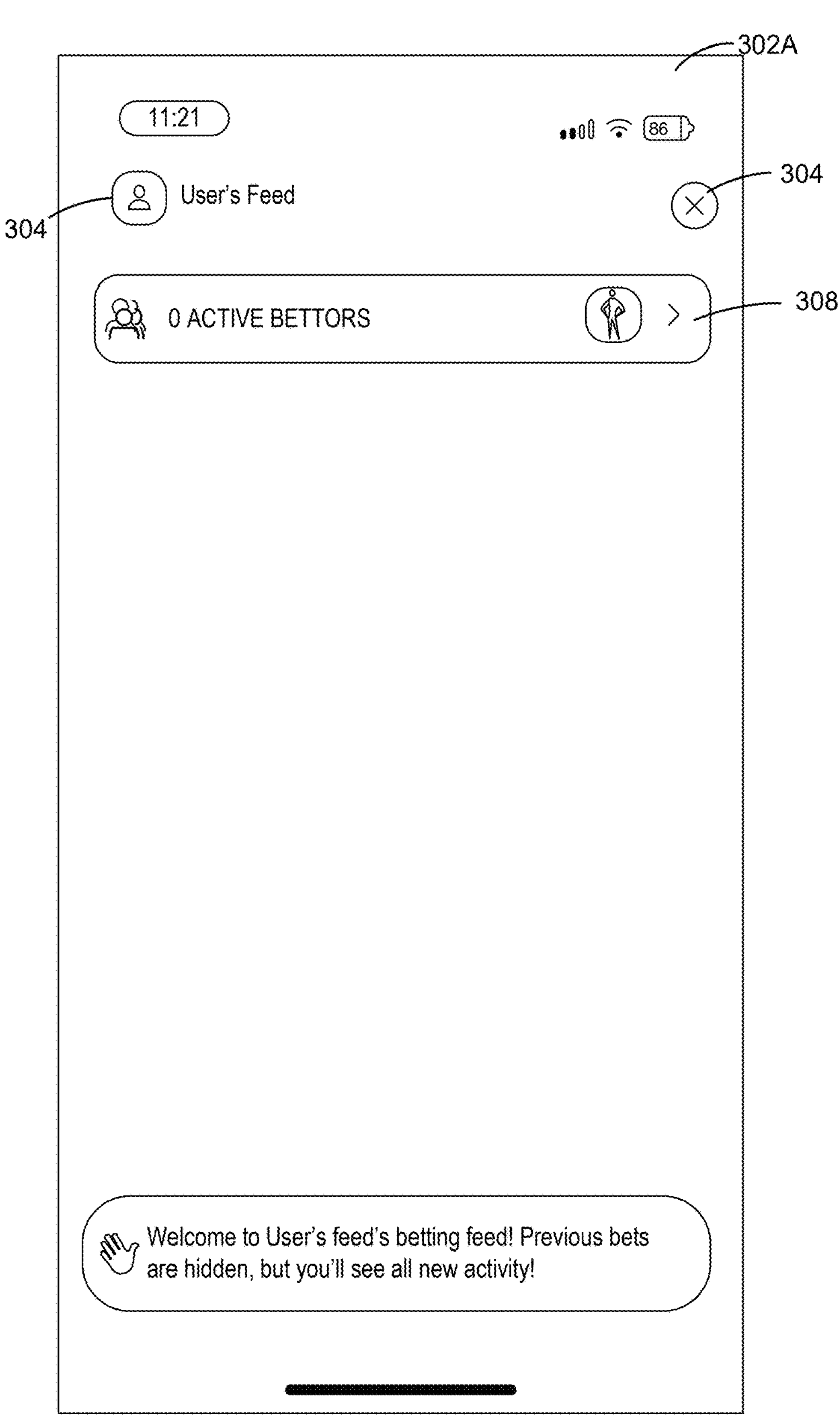
FIG. 3A shows a graphical user interface presenting content for an example network application feed, in accordance with one or more implementations.
Figure 3B:
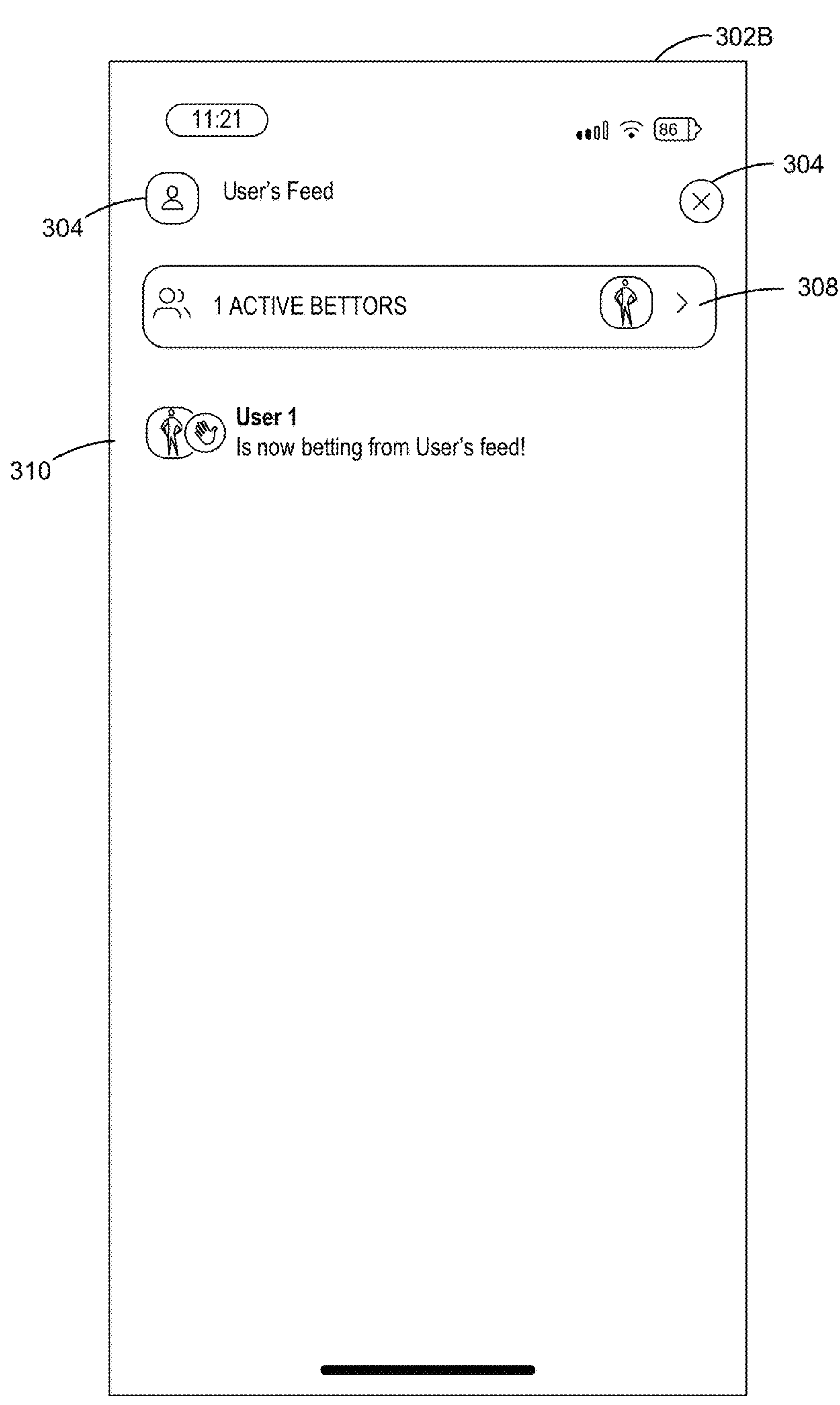
FIG. 3B shows a graphical user interface presenting content for an example network application feed, in accordance with one or more implementations.
Figure 3C:
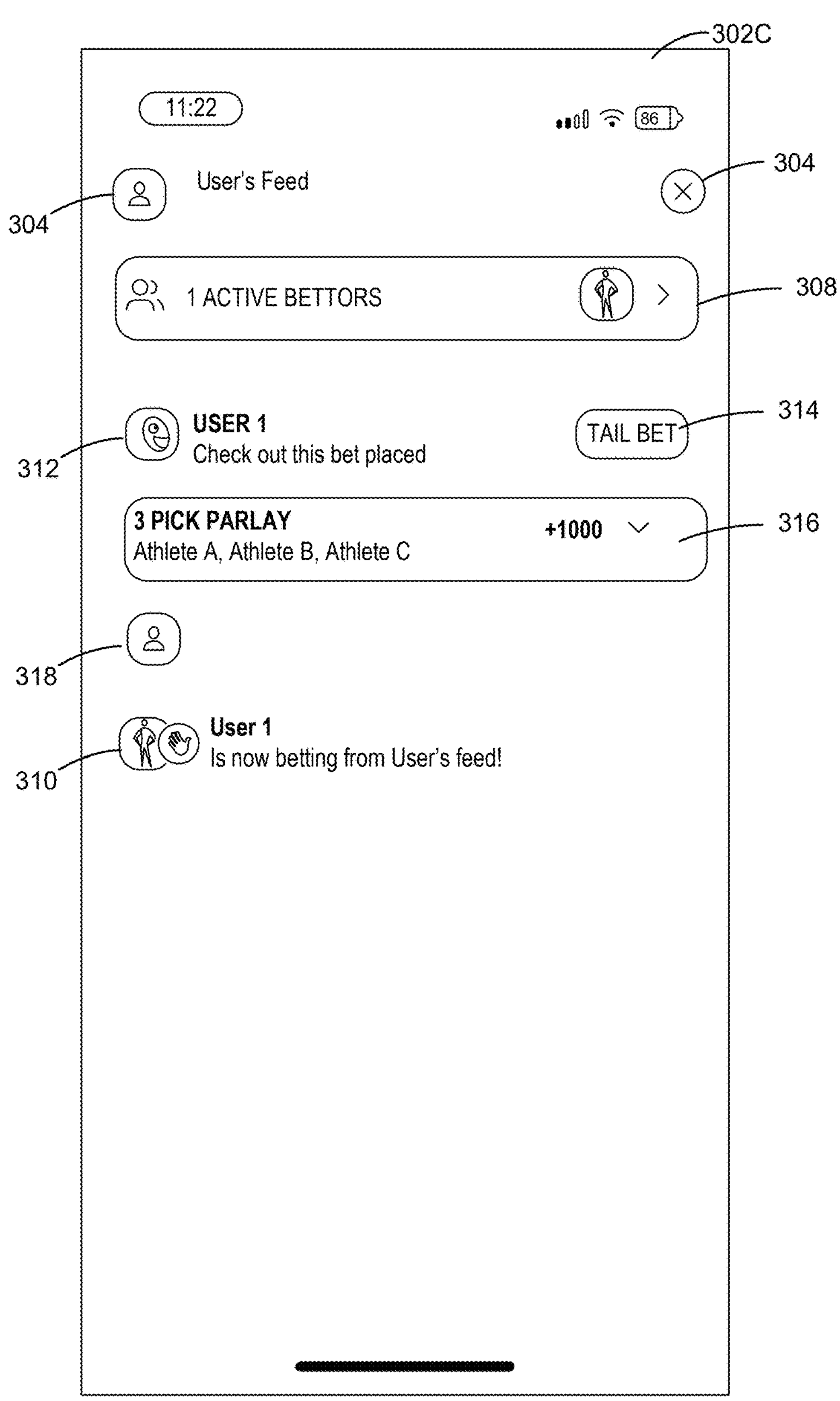
FIG. 3C shows a graphical user interface presenting content for an example network application feed, in accordance with one or more implementations.

The feed manager 240 can provide, to other client devices 220 that are members, participants, or owners of the network application feed 290, data indicative of any notifications/message having a selected notification type (e.g., comment, reaction emoji, tail, etc.) for presentation in connection with a corresponding data record 280 via application interfaces such as the graphical user interface 302C of FIG. 3C. The feed manager 240 can identify one or more client devices 220 associated with the network application feed 290 and can determine which client devices 220 are to receive the data indicative of the notification type. The notification type can correspond to an interaction with the data record 280, such as a reaction emoji, a tailing action, or a sharing event, among others. In some implementations, the feed manager 240 can transmit the data indicative of the notification type to the identified client devices 220 using the network 210 or the local communication network 212. The client devices 220 can receive the data indicative of the notification type and can present the notification in connection with the data record 280 within the application interfaces. In some implementations, the notification can be presented as an animated overlay, an icon, or a visual indicator that is displayed in association with the data record 280, or within a designated region of the application interface.

In some implementations, the feed manager 240 can update the respective set of network data records 280 of the first network application feed 290 to include the second data record 280 and at least a portion of a second set of network parameters 282. The second set of network parameters 282 can include values that are identical to or derived from the first set of network parameters 282 associated with the first data record 280. For example, the feed manager 240 can generate the second data record 280 such that the wager selection, event, or odds match those of the first data record 280, while other parameters such as wager amount, player identifier, or other player-specified changes or data can be specific to the client device 220 submitting the request. The feed manager 240 can store the second data record 280 in association with the first network application feed 290 and can provide an update to one or more client devices 220 indicating that the second data record 280 has been added as a tailed wager. The second data record 280 can be executed or otherwise placed in response to the request.

Tailed wagers generated as data records 280 that are included in a network application feed 290 can be provided to application interfaces of other client devices 220 that are members, participants, or owners of the network application feed 290. In some implementations, the feed manager 240 can transmit data records 280 representing tailed wagers to the client devices 220 via the network 210 or the local communication network 212. The client devices 220 can receive the data records 280 and present the tailed wagers within a graphical user interface, such as the graphical user interface 302C or the graphical user interface 302D. In some implementations, the data records 280 corresponding to tailed wagers can include metadata identifying the originating user, the parameters 282 of the wager, or a timestamp associated with the action. The feed manager 240 can update the network application feed 290 in real time or near real time to reflect the addition of tailed wagers, and can provide notifications or visual indicators to the client devices 220 to indicate that a tailed wager has been generated. In some implementations, the permissions 265 can be referenced to determine whether a client device 220 is authorized to view or interact with tailed wagers included in the network application feed 290.

The feed manager 240 can detect a change in a status of a data record 280 included as part of a network application feed 290 and can provide, to one or more client devices 220 that are members, participants, or owners of the network application feed 290, data indicative of the change in the status of the data record 280 for presentation in a second application interface. The status of a data record 280 may be determined based on information received from an external computing system, such as a third-party event data provider, a sportsbook server, or an internal event system. For example, the feed manager 240 may receive a message or notification from an external computing system indicating that a particular wager outcome has been resolved, and may update the status of the corresponding data record 280 accordingly. Status values may include, but are not limited to, open, closed, completed, won, lost, partially won, voided, or pending, among others. The feed manager 240 may process the received status information and update the relevant data structures in storage 215 and may transmit an update or notification to the appropriate client devices 220 to reflect the updated status in the user interface.

In some implementations, the feed manager 240 may track status changes for both single wagers and multi-leg wagers, such as parlays or exotics. For a single wager, the status may transition from open (pending event resolution) to completed (resolved as won or lost) based on the outcome of the underlying event. For a multi-leg wager, such as a parlay, the feed manager 240 may receive individual status updates for each leg of the wager, and may track the progress of each leg independently. For example, as each leg of a parlay is resolved, the feed manager 240 may update the status of the corresponding leg within the data record 280, and may determine an overall status for the parlay (e.g., partially won, still open, or lost if a leg fails). The feed manager 240 may provide granular status updates to client devices 220, enabling users to monitor the outcome of individual legs as well as the overall wager, and may present these updates in real time or near real time within the application interface.

In some implementations, the data processing system 205 can coordinate automatic joining, leaving, or re-joining of network application feeds 290 for one or more client devices 220A-220N. The data processing system 205 can receive a signal from a client device 220 indicating a proximity event or a connectivity change with respect to a local communication network 212, such as a Bluetooth connection or a wireless fidelity connection, among others. Based on the received signal, the data processing system 205 can determine whether the client device 220 should join, leave, or re-join a network application feed 290 and can update group membership accordingly. Further details are described herein. Automatic disconnection and re-joining of network application feeds 290 may be implemented using the session manager 250, as described in further detail herein.

Owner/administrator client devices 220 (e.g., those that establish a network application feed(s) 290) can monitor local communications via the local communication network 212. For example, the owner/administrator client devices 220 can monitor connections to a list of member client devices 220 by accessing membership data structures maintained in the permissions 265 or in a locally maintained copy of the permissions 265 (which may be updated via communications with the data processing system 205). The permissions 265 can include a list of identifiers corresponding to each member client device 220 that is currently approved for participation in a network application feed 290. The owner or administrator client device 220 can periodically query the data processing system 205 to retrieve an updated list of member client devices 220. In some implementations, the data processing system 205 may provide lists of member client devices 220 to the owner/administrator client device 220 in response to a request or automatically upon updating the permissions 265 of a corresponding network application feed 290.

The data processing system 205 can provide, in response to the query, a data structure that includes device identifiers, network profile identifiers, or session tokens associated with each member client device 220. The owner or administrator client device 220 can display the retrieved list in an application interface, such as by presenting a graphical user interface that enumerates active members, their connection status, or additional metadata such as last activity timestamp or proximity information. In some implementations, the owner or administrator client device 220 can monitor the proximity of member client devices 220 by detecting local connections via the local communication network 212.

The owner or administrator client device 220 can periodically determine whether each member client device 220 remains within a defined proximity threshold. The owner or administrator client device 220 can detect a loss of proximity when a member client device 220 disconnects from the local communication network 212 or moves outside the communication range. Upon detecting that a member client device 220 is no longer proximate, the owner or administrator client device 220 can transmit a message to the data processing system 205 indicating that the member client device 220 should be removed from the network application feed 290. The data processing system 205 can update the permissions 265 and the membership list of the network application feed 290 to reflect the removal of the member client device 220.

The session manager 250 can automatically remove or restrict one or more player profiles 270 and/or client devices 220 access to a network application feed 290. The session manager 250 can receive, from a client device 220 identified as an owner or administrator of the network application feed 290, an indication that a member client device 220 has disconnected from the local communication network 212 with the owner or administrator client device 220. To do so, the session manager 250 can update permissions 265 associated with the network application feed 290 to remove an identifier of the player profile 270 or a device identifier of the member client device 220. The session manager 250 can transmit a notification to one or more remaining client devices 220 associated with the network application feed 290 to indicate that the member client device 220 has been removed from the network application feed 290. In some implementations, the session manager 250 can update the storage 215 to reflect the change in membership and restrict access to content items 275 or data records 280 of the network application feed 290 for the member client device 220 that has been removed.

The feed manager 240 can restrict presentation of the set of network data records 280 of the network application feed 290 at the second client device 220. In some implementations, the feed manager 240 can transmit a message or instruction to the second client device 220 after the second client device 220 has been removed from the network application feed 290, where the message can cause the second client device 220 to disable or hide access to the set of network data records 280 of the network application feed 290. In some implementations, the feed manager 240 can cause the second client device 220 to display a notification indicating that access to the network application feed 290 has been revoked. In some implementations, the feed manager 240 can instruct the second client device 220 to clear any locally cached copies of the network data records 280 or to terminate any active user interface session associated with the network application feed 290. In some implementations, the feed manager 240 can transmit a command to the second client device 220 to redirect the second client device 220 to a different application interface or to a default home screen. In some implementations, the feed manager 240 can require the second client device 220 to re-authenticate or to request new permissions before regaining access to the network application feed 290.

In some implementations, the session manager 250 can receive, from the owner client device 220 or the disconnected member client device 220, a message indicating that the previously disconnected member client device 220 has reconnected via the local communication network 212. The session manager 250 can detect reconnection events in a variety of ways. In some implementations, the session manager 250 and/or the owner/administrator client device 220 can receive a periodic heartbeat signal or presence notification from the member client device 220 after the member client device 220 re-establishes connection with the owner/administrator client device 220. In some implementations, the session manager 250 can receive a reconnection message from the owner client device 220, which can monitor the connectivity status of each member client device 220 and transmit a notification to the session manager 250 when a member client device 220 reconnects within a defined proximity or communication radius. In some implementations, the session manager 250 can receive a reconnection signal when the member client device 220 re-joins a group after a temporary disconnect, such as when the member client device 220 returns to wireless communication range after leaving the area.

In some implementations, the session manager 250 can use a time threshold to determine whether a member client device 220 is eligible for automatic reconnection. For example, the session manager 250 can maintain a timer that tracks the duration of disconnection for each member client device 220. If the member client device 220 reconnects via the local communication network 212 within a predetermined time period (e.g., five minutes, ten minutes, fifteen minutes, thirty minutes, etc.) the session manager 250 can automatically re-add the member client device 220 to the network application feed 290 (e.g., via updating permissions 265, etc.) without necessarily requiring additional approval.

The session manager 250 can identify the member client device 220 using a persistent device identifier, token, or other value exchanged during the initial group formation or whitelisting/joining process. The session manager 250 can process the reconnection by verifying the device identifier/token/value, updating the permissions 265 to restore group membership, and transmitting a catch-up synchronization of network data records 280 and session state to the reconnected member client device 220. In some implementations, the session manager 250 can use the local communication network 212 to exchange authentication tokens, session keys, or encrypted messages to confirm the identity and status of the rejoining member client device 220 before restoring access to the network application feed 290.

The feed manager 240 can update the permissions 265 of the network application feed 290 to permit the now-reconnected client device 220 to access the network application feed 290. In some implementations, the feed manager 240 can receive a signal from the session manager 250 indicating that the client device 220 has reconnected to the local communication network 212 within a predetermined time period after a disconnection event. The feed manager 240 can identify the client device 220 using a persistent device identifier or a session token previously associated with the network application feed 290.

The feed manager 240 can verify the identity of the client device 220 and/or associated player profile 270 and can restore membership in the network application feed 290 by updating the permissions 265 to include the client device 220 (and/or the corresponding player profile 270) as an active participant in the network application feed 290. The feed manager 240 can transmit a synchronization message to the client device 220, where the synchronization message can include updated network data records 280 and/or session state data corresponding to the network application feed 290. In some implementations, the feed manager 240 can update a membership list or access control data structure in the permissions 265 to reflect the re-addition of the client device 220. The feed manager 240 can transmit a notification to one or more client devices 220 associated with the network application feed 290 indicating that the client device 220 has rejoined the network application feed 290.

In some implementations, the session manager 250 can maintain membership in a network application feed 290 according to device location. For example, the session manager 250 can receive, monitor, or query device information that includes location information of a client device 220 that is identified as a member of a network application feed 290 or is associated with a player profile 270 that is identified as a member of the network application feed 290. In some implementations, the session manager 250 can compare the location information of the client device 220 to one or more location criteria associated with the network application feed 290.

The session manager 250 can determine whether the client device 220 remains within a defined geographic area, geofence, or proximity threshold for continued membership in the network application feed 290. In some implementations, the session manager 250 can update a membership list or permissions 265 associated with the network application feed 290 based on the location information of the client device 220. The session manager 250 can transmit a notification to one or more client devices 220 associated with the network application feed 290 to indicate a change in membership status based on device location. In some implementations, the session manager 250 can store historical location data of the client device 220 in the storage 215 in association with the network application feed 290.

In some implementations, the feed manager 240 can determine, based on location information of the client device 220, that the second client device 220 is to be restricted from accessing the network application feed 290. The feed manager 240 can receive location information from the client device 220 or from the second client device 220. The feed manager 240 can compare the received location information to one or more location criteria associated with the network application feed 290. The location criteria can include a geographic boundary, a geofence, or a proximity threshold, among others. The feed manager 240 can determine whether the second client device 220 is located outside the location criteria for the network application feed 290. In response to determining that the second client device 220 is located outside the location criteria, the feed manager 240 can identify the second client device 220 for restriction from the network application feed 290.

The feed manager 240 can update, responsive to determining that the client device 220 is to be restricted according to its location, the permission 265 of the network application feed 290 such that the second client device 220 is restricted from accessing the network application feed 290. The feed manager 240 can remove an identifier of the second client device 220 or an identifier of a network profile 270 associated with the second client device 220 from a membership list or access control data structure of the corresponding permissions 265. The feed manager 240 can transmit a notification to the client device 220 indicating that access to the network application feed 290 has been restricted. In some implementations, the feed manager 240 can transmit a notification to one or more client devices 220 associated with the network application feed 290 to indicate the change in membership status of the second client device 220 (e.g., a content item 275 indicating that the client device 220 has left, etc.).

In some implementations, the session manager 250 can monitor the location of a client device 220 relative to a predetermined geographic area or geofence associated with a network application feed 290. The session manager 250 can use location services available on the client device 220, such as global positioning system signals, WiFi triangulation, or Bluetooth-based proximity detection, to periodically or continuously evaluate whether the client device 220 is within a defined proximity threshold. The session manager 250 can maintain a geofence or location boundary for the network application feed 290, such as a defined radius around a physical venue or a set of coordinates corresponding to a particular event location. When the client device 220 that was previously a participant in the network application feed 290 exits the geofenced area, the feed manager 240 can update the permissions or membership list to reflect the departure of the client device 220. The feed manager 240 can optionally restrict access to feed content or suspend real-time updates for the client device 220.

Upon detecting that the client device 220 has re-entered the predetermined location or geofenced area associated with the network application feed 290, the session manager 250 can initiate an automatic reconnection process for the client device 220. The session manager 250 can verify the identity of the client device 220 by referencing a persistent device identifier or user profile previously associated with the network application feed 290. The feed manager 240 can update the permissions or membership list to restore access of the client device 220 to the network application feed 290. In some implementations, the feed manager 240 can provide a catch-up synchronization to the client device 220. The catch-up synchronization can include any updates to the feed state, data records, or group activity that occurred during the period of absence.

In some implementations, the client devices 220 that have connected to a network application feed 290 can present graphical user interfaces configured to display information and interactive elements related to group betting activity. The client devices 220 can receive data from the data processing system 205 and can render user interfaces that reflect current session state, participant actions, or shared bet information. The presentation and arrangement of such interfaces can vary based on the type of activity, the role of the user, or the configuration of the network application feed 290. Further details of various user interface features are described in connection with FIGS. 3A-3E.

Referring now to FIG. 3A in the context of the components described in connection with FIG. 1, illustrated is an example graphical user interface 302A presenting content for a network application feed, in accordance with one or more implementations. The graphical user interface 302A can include at least one feed name region 304 and at least one active profiles region 308.

The graphical user interface 302A can be used to present content for a network application feed (e.g., a network application feed 290 of FIG. 2). The graphical user interface 302A may be presented via an application executing on a client device (e.g., a client device 220 of FIG. 2). In some implementations, the graphical user interface 302A can be displayed on a client device after a user joins a network application feed, before any other members have joined the same network application feed 290. The graphical user interface 302A can present a visual indication that the player has successfully joined the network application feed, such as by displaying a welcome message or a status notification. In some implementations, the graphical user interface 302A can display a feed name region 304 to identify the network application feed 290 currently being viewed. In some implementations, the graphical user interface 302A can display a notification or message indicating that previous data records (e.g., data records 280 representing wager opportunities, join requests, etc.) are hidden and that new activity will be visible as it occurs.

The graphical user interface 302A can include at least one feed name region 304. In some implementations, the feed name region 304 can be displayed at the top of the graphical user interface 302A and can include a text label or graphical icon identifying the network application feed and/or an owner/administrator of the network application feed. The feed name region 304 can display the name of the network application feed, which may be a player-selected title or a default group name. In some implementations, the feed name region 304 can include additional graphical elements, such as a group icon, a close button, or a status indicator. The feed name region 304 can remain visible as the user interacts with other portions of the graphical user interface 302A, with additional activity/events being presented below the header region 304.

The graphical user interface 302A can include at least one active profiles region 308. In some implementations, the active profiles region 308 can display a count or list of users currently active in the network application feed 290. When the user is the only member present, the active profiles region 308 can display an indicator such as "0 active bettors" or a similar message. The active profiles region 308 can update in real time or near real time as additional users join or leave the network application feed 290. In some implementations, the active profiles region 308 can include graphical icons or avatars representing each active member, or can provide access to a detailed list of participant profiles. The active profiles region 308 can be positioned below the feed name region 304 within the graphical user interface 302A.

Referring now to FIG. 3B, illustrated is an example graphical user interface 302B presenting content for an example network application feed, in accordance with one or more implementations. The graphical user interface 302B can include at least one feed name region 304, at least one active profiles region 308, and at least one join notification 310. The graphical user interface 302B can be presented via one or more applications executing on a client device (e.g., the client device 220). An application executing on the client device can receive data corresponding to a network application feed 290 and can display the graphical user interface 302A of FIG. 3A and/or the graphical user interface 302B in response.

The application executing on the client device can receive information regarding the feed name region 304, the active profiles region 308, or the join notification 310 from a data processing system 205 or from other client devices (e.g., via the network 210 or the local communication network 212 of FIG. 2). The application can generate a display that includes the feed name region 304 at a header location, the active profiles region 308 below the header, or the join notification 310 in a content area of the graphical user interface 302B. In some implementations, the application can update the graphical user interface 302B in real-time or near real-time based on changes in activity or membership of network application feeds. The application can receive interactions via the graphical user interface 302B and can transmit corresponding requests or responses to a data processing system (e.g., the data processing system 205), as described herein.

The graphical user interface 302B can follow the interface depicted in FIG. 3A and can provide additional information regarding participation within the corresponding network application feed. The graphical user interface 302B can include a feed name region 304, which can display the name or identifier of the network application feed being viewed. In some implementations, the feed name region 304 can be positioned at the upper portion of the graphical user interface 302B and can include a text label or graphical indicator corresponding to the current feed. The graphical user interface 302B can further include an active profiles region 308. The active profiles region 308 can display a count or list of users currently active in the network application feed. In this example, the active profiles region 308 can present a numerical indicator, shown as "1 ACTIVE BETTORS." In some implementations, the active profiles region 308 can display graphical elements (e.g., icons, images, text, etc.) representing one or more active participants.

The graphical user interface 302B can further include a join notification 310. The join notification 310 can be presented as a content item (e.g., a content item 275) within the interface and can indicate that a user has joined or is now participating in the network application feed. The join notification 310 can include a player profile identifier and a message indicating a corresponding participation status, such as "is now betting from [feed name]." The join notification 310 can be displayed in real-time or near real-time as players join the network application feed. The graphical user interface 302B can be updated dynamically according to the techniques described herein to reflect additional join notifications 310 or changes in the active profiles region 308 as new users are detected or approved for participation in the network application feed.

Referring now to FIG. 3C, illustrated is an example graphical user interface 302C for a digital sports betting platform, in accordance with one or more implementations. The graphical user interface 302C can include at least one feed name region 304, at least one active profiles region 308, at least one join notification 310, at least one network data record notification 312, at least one tail bet button 314, at least one data record parameters region 316, and at least one interaction button 318. The graphical user interface 302C can be presented via one or more applications executing on a client device (e.g., the client device 220). An application executing on the client device can receive data corresponding to a network application feed 290 and can display the graphical user interface 302C of FIG. 3C.

The graphical user interface 302C can be presented following the graphical user interface 302B after a wager has been placed and a network application feed has been updated to reflect the activity. The graphical user interface 302C can include a feed name region 304 that identifies the current network application feed being viewed. The graphical user interface 302C can further include an active profiles region 308 that displays the number of players currently engaged in activity (e.g., wagering, viewing, interacting, etc.) within the network application feed. In some implementations, the graphical user interface 302C can include the join notification 310 described in connection with FIG. 3B. The graphical user interface 302C can display a network data record notification 312, which can present an indication of a data record (e.g., a wager) placed by a player. The network data record notification 312 can include the identifier of player and a message associated with the placed wager.

In some implementations, the graphical user interface 302C can present a tail bet button 314 adjacent to the network data record notification 312. The tail bet button 314 can be an interactive element that allows other users to follow or copy the wager associated with the data record. The graphical user interface 302C can further include a data record parameters region 316 that summarizes the specifics of the wager. For example, the data record parameters region 316 can display the type of wager as a parlay and can indicate the number of selections, which in this example is a "3 pick parlay." The data record parameters region 316 can also display the odds associated with the wager, which in this example is shown as "+1000." In some implementations, the data records added to the network application feed can be presented in a collapsed state such that only the type of wager and the odds are visible, without necessarily displaying the underlying selections.

Figure 3D:
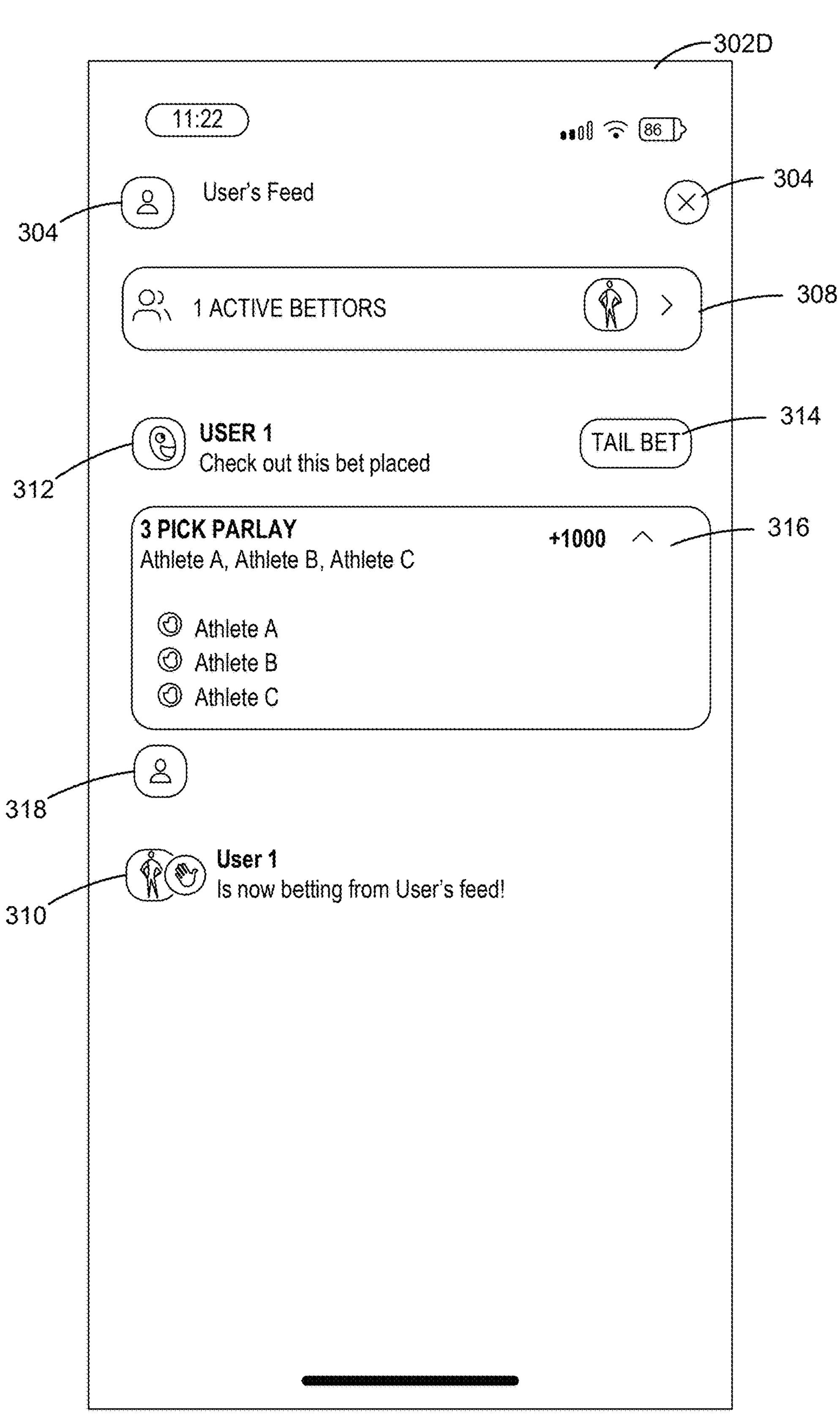
FIG. 3D shows a graphical user interface presenting content for an example network application feed, in accordance with one or more implementations.

Referring now to FIG. 3D, illustrated is a graphical user interface 302D depicting an example network application feed for a digital sports betting platform. The graphical user interface 302D can include at least one feed name region 304, at least one active profiles region 308, at least one join notification 310, at least one network data record notification 312, at least one tail bet button 314, at least one data record parameters region 316, and at least one interaction button 318. The graphical user interface 302D can be presented via one or more applications executing on a client device (e.g., the client device 220). An application executing on the client device can receive data corresponding to a network application feed 290 and can display the graphical user interface 302D of FIG. 3D.

The graphical user interface 302D can include the feed name region 304, which can display an identifier for the current feed being viewed. The graphical user interface 302D can further include the active profiles region 308, which can indicate a number of players currently participating in the feed. In some implementations, the graphical user interface 302D can include a join notification 310, which can provide an indication that the player has previously joined the feed. The graphical user interface 302D can include the network data record notification 312, which can display information about a data record, such as a bet placed by a player, as described in connection with FIG. 3C.

The graphical user interface 302D can be displayed following the graphical user interface 302C after a player interacts with a data record notification 312 to reveal additional details. The graphical user interface 302D can include the tail bet button 314, which can allow a player to initiate a tailing action for a displayed bet. The graphical user interface 302D can include a data record parameters region 316, which can present the selections or parameters associated with the data record, such as individual legs of a parlay. The graphical user interface 302D can further include an interaction button 318, which can allow a player to perform additional actions or provide feedback in connection with the data record. In some implementations, the graphical user interface 302D can display the expanded details of a wager, including one or more selected outcomes (e.g., parlay legs, in this example), after a player selects or interacts with the network data record notification 312 in the graphical user interface 302C.

Figure 3E:
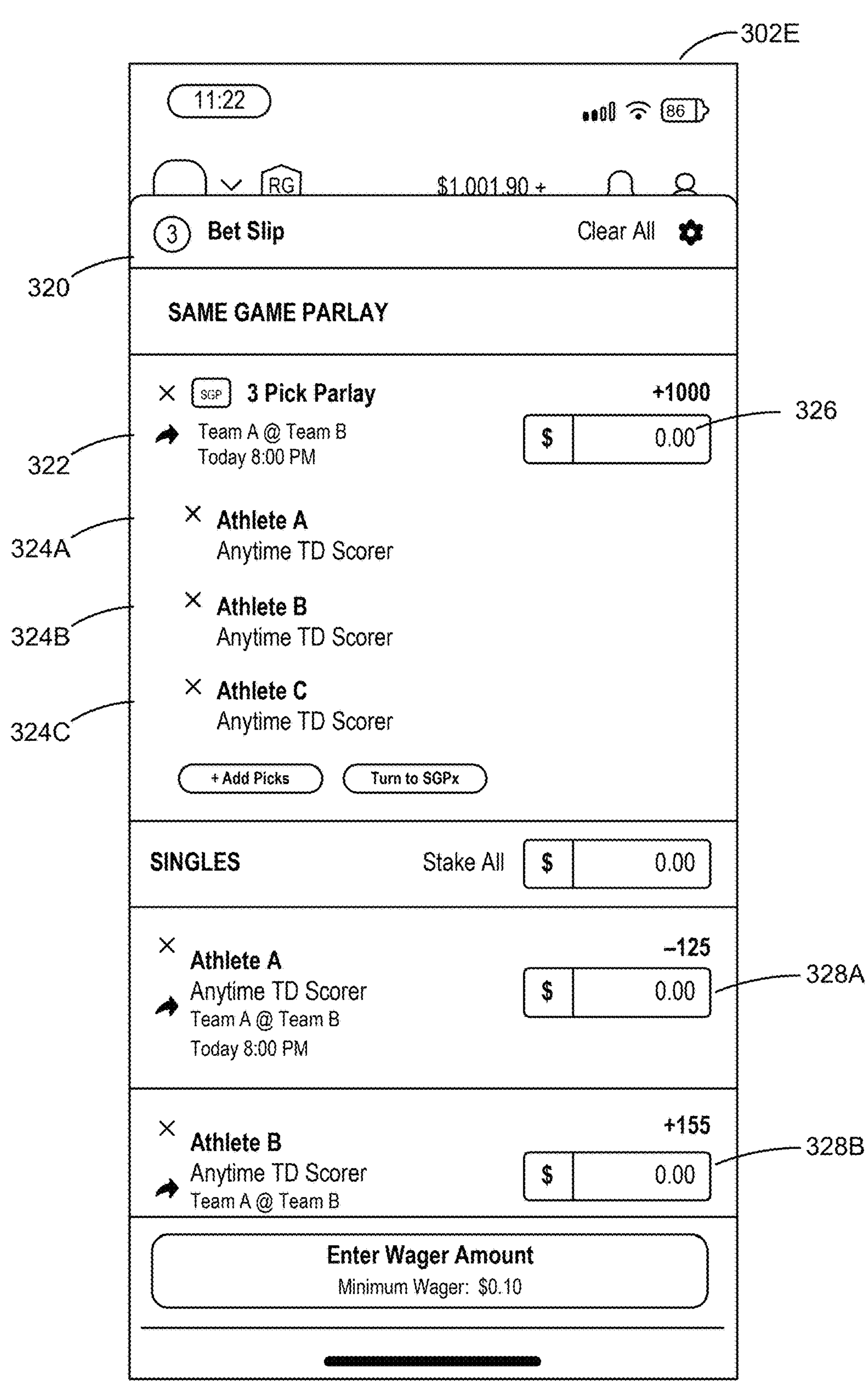
FIG. 3E shows a graphical user interface presenting graphical elements to generate an example data record, in accordance with one or more implementations.

Referring now to FIG. 3E, illustrated is an example graphical user interface 304 presenting graphical elements to generate an example data record, in accordance with one or more implementations. The graphical user interface 304 can include at least one status bar 302E, at least one data record generation overlay 320, at least one data record region 322, one or more parlay selections 324A-324C, at least one data record value region 326, and one or more additional data record regions 328A-328B. The graphical user interface 302E can be presented via one or more applications executing on a client device (e.g., the client device 220). An application executing on the client device can receive data corresponding to a network application feed 290 and can display the graphical user interface 302E of FIG. 3E.

FIG. 3E illustrates a graphical user interface 302E that can be presented on a client device in response to a player interacting with a tail bet button 314 in the graphical user interface 302D of FIG. 3D. The graphical user interface 302E can include a status bar 302E that can display device information, such as the time or battery status. The graphical user interface 302E can include a data record generation overlay 320 that can be presented as a bet slip interface window. The data record generation overlay 320 can include a data record region 322. The data record region 322 can display a parlay section header indicating the wager type, which in this example is a "3 Pick Parlay" and can list individual parlay selections 324A, 324B, or 324C. Each parlay selection 324A, 324B, or 324C can correspond to a player pick for an event, such as a player being selected as an anytime touchdown scorer in a football game. The parlay selection 324A, 324B, or 324C can be populated with the same selections as the wager that was tailed from FIG. 3D.

The data record region 322 can include a data record value region 326. The data record value region 326 can allow a player to enter a wager amount for the parlay and can display the associated odds for the parlay. The graphical user interface 302E can allow the player to enter wager amounts for single bets and can display the odds associated with each single bet. In some implementations, the data record generation overlay 320 can further include additional data record regions 328A or 328B. Each additional data record region 328A or 328B can correspond to a single bet wager input field for an individual bet, separate from the parlay wager. The additional data record regions 328A or 328B can display player selections, which can be additional single wager selections that correspond to the legs of the parlay wager shown in the regions 324A and 324B, as shown. The graphical user interface 304 can allow the player to review, modify, or confirm selections for both parlay and single bets before submission. The graphical user interface 304 can include a submit wager button 330 that can confirm the wager and cause the client device to transmit a request to place the corresponding wager according to the provided data record parameters. The request may specify the original wager from which the requested wager was tailed.

Figure 4:
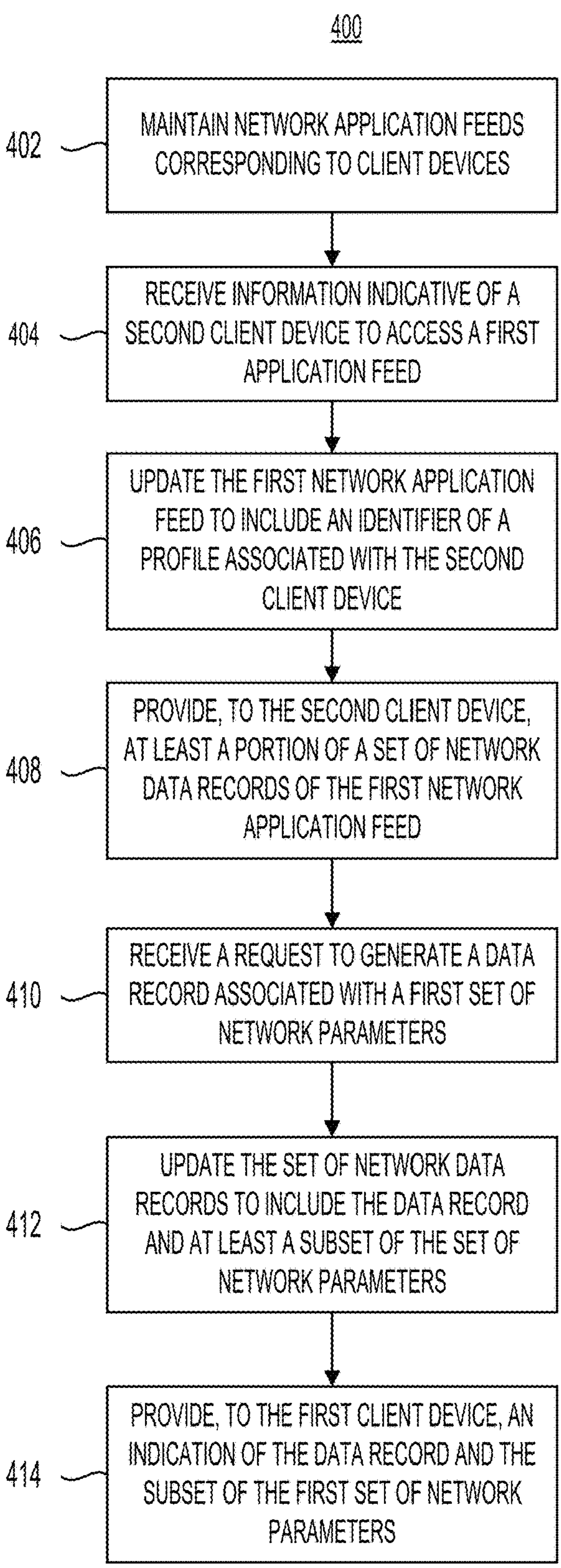
FIG. 4 illustrates a flow chart of a method for synchronizing network application feeds and data records across multiple client devices, in accordance with one or more implementations.

Referring now to FIG. 4, illustrated is a method 400 of synchronizing network application feeds and data records across multiple client devices in a digital sports betting platform. The method 400 can be executed, performed, or otherwise carried out by any of the computing systems or devices described herein. In brief overview of the method 400, the method 400 can include maintaining network application feeds corresponding to client devices (STEP 402), receiving information indicative of a second client device to access a first application feed (STEP 404), updating the first network application feed to include an identifier of a profile associated with the second client device (STEP 406), providing to the second client device at least a portion of a set of network data records of the first network application feed (STEP 408), receiving a request to generate a data record associated with a first set of network parameters (STEP 410), updating the set of network data records to include the data record and at least a subset of the set of network parameters (STEP 412), and providing to the first client device an indication of the data record and the subset of the first set of network parameters (STEP 414).

The method 400 can include maintaining network application feeds (e.g., network application feeds 290) corresponding to client devices (e.g., client devices 220) (STEP 402). For example, a data processing system (e.g., the data processing system 205) can maintain one or more network application feeds can be maintained, where each network application feed can correspond to a respective client device. To do so, any of the operations of the feed manager 250 of FIG. 2 may be performed. Each network application feed can include or may be associated with a respective set of network data records (e.g., data records 280), which themselves may be associated with a corresponding set of network data parameters (e.g., network data parameters 282). As described herein, the network application feeds can be established based on location information associated with one or more client devices. The network application feeds can be stored in a memory (e.g., storage 215) and can be indexed by identifiers associated with the client devices or player profiles (e.g., player profiles 270).

In some implementations, the network application feeds can be updated to reflect changes in membership, group parameters, or data record state. The network application feeds can be associated with permissions that define which client devices can access, modify, or view content within each network application feed. The network application feeds can be mirrored or synchronized across multiple client devices, such that all participants can view consistent data record state. A subset of the network application feeds can be identified based on proximity or location information of a client device, where each network application feed of the subset is associated with a respective location within a threshold distance of the location information of the client device. The subset can be provided for presentation in an application interface at the requesting client device, such that the client device can request to join one or more proximate network application feeds.

The method 400 can include receiving, from a first client device identified as an owner/controller of a first network application feed, information indicative of a second client device requesting access to the first network application feed (STEP 404). In some implementations, the information can be provided in a request that can be received from the second client device (e.g., the client device requesting access to the network application feed) to request access to the first network application feed. The request may include a token or identifier of a client device that is an owner of the network application feed, which may be provided via a local communication network (e.g., the local communication network 212). In some implementations, the information can be received in a local network communication from the second client device, or can include location information of the second client device. In some implementations, the information can include a device identifier, a player profile identifier, or a session token associated with the second client device.

In some implementations, the information can be processed to determine whether the second client device is within a threshold distance of a location associated with the first network application feed. The information can be indicative of a local wireless network communication transmitted from the second client device to the first client device.

In some implementations, a verification process can be initiated based on the received information to determine whether the second client device is authorized to access the first network application feed, such as by referencing permissions or access control data. A prompt or notification can be transmitted to the first client device to approve or deny the access request from the second client device. Any of the operations of the feed manager 240 or the device communicator 230 of FIG. 2 can be performed in connection with any operations of STEP 404 of the method 400.

The method 400 can include updating the first network application feed to include an identifier of a player profile (e.g., a player profile 270) associated with the second client device (STEP 406). To do so, any of the operations described in connection with the feed manager 240 of FIG. 2 can be performed. The first network application feed can be updated to include an identifier of a profile associated with the second client device based on the second client device being approved to access the first network application feed. The identifier can be appended to a membership list or access control data structure associated with the first network application feed. In some implementations, the update can be performed in response to an approval signal received from the first client device, as described herein. In some implementations, the update can be performed in response to determining that the second client device is within a threshold distance of a location associated with the first network application feed. The identifier of the profile associated with the second client device can be stored in a data structure that tracks active participants of the first network application feed. The update can be reflected in real-time or near real-time in interfaces presented to client devices associated with the first network application feed.

The method 400 can include providing, to the second client device, at least a portion of a set of network data records of the first network application feed (STEP 408). To do so, any of the operations of the feed manager 240, the device communicator 230, or the data record generator 260 of FIG. 2 can be performed. At least a portion of the respective set of network data records of the first network application feed can be provided to the second client device for presentation in a first application interface, following updating of the first network application feed to include an identifier of a profile associated with the second client device. The portion can include a subset of information for each data record, such as odds, wager type, selected outcome, or status, among others. In some implementations, the subset can exclude certain information, such as wager amount or other sensitive data, that is otherwise associated with the corresponding data record and/or parameters thereof.

The network data records can be represented in the first application interface as interactive elements (e.g., as described in connection with FIGS. 3C and 3D, etc.). The interactive elements can enable the second client device to copy a data record or provide one or more interactions with the data record within the first network application feed, as described herein in connection with FIG. 2. In some implementations, the interactive elements can include selectable/interactive controls that allow the second client device to initiate further actions, such as tailing a bet, sharing a data record, or displaying additional details, among other operations described herein. The network data records and/or data record parameters (or data thereof or derived therefrom) can be transmitted to the second client device using a network or a local communication channel.

The method 400 can include receiving a request to generate a data record associated with a first set of network parameters (STEP 410). A request can be received from the first client device to generate a data record associated with a first set of network parameters. The request can include information such as wager selections, odds values, or user identifiers, among others. The request can be transmitted via a network or a local communication channel. In some implementations, the request can be generated in response to an interaction with an application interface displayed at the first client device. The request can specify parameters such as event selection, wager type, or odds. The request can be processed to extract the relevant data and associate the data record with the first set of network parameters. In some implementations, a unique identifier can be generated for the data record or the data record can be associated with a profile of the first client device. STEP 410 of the method 400 may include performing any of the operations described in connection with the data record generator 260 of FIG. 2.

The method 400 can include updating the set of network data records to include the data record and at least a subset of the set of network parameters (STEP 412). To do so, any of the operations of the feed manager 240 can be performed. The set of network data records can be updated to include the generated data record and at least a subset of the first set of network parameters. The update can be performed in response to the request from the first client device or in response to generating the data record. The data record and the subset of the first set of network parameters can be appended to the set of network data records of one or more network application feeds in which the first client device is identified as a member. In some implementations, metadata associated with the network application feed can be updated to reflect the addition of the data record. An update notification or indication can be transmitted to one or more client devices associated with the network application feed to indicate that the data record has been added. The data record can be reflected in one or more interfaces of the network application feed.

The method 400 can include providing to the first client device an indication of the data record and the subset of the first set of network parameters (STEP 414). Any of the operations of the data processing system 205 of FIG. 2 can be performed to implement the operations of STEP 414. An indication of the data record and the subset of the first set of network parameters can be provided to the first client device for presentation in a second application interface. The indication can include information such as wager selection, odds, status, or other relevant parameters. The indication can be transmitted to the first client device in response to updating the set of network data records. In some implementations, the indication can be presented as a notification, a content item (e.g., a content item 275) an overlay, or any other type of visual indicator in the second application interface. The indication can enable the first client device to view the status or details of the generated data record. In some implementations, the indication can be provided in real-time or near real-time.

Figure 5:
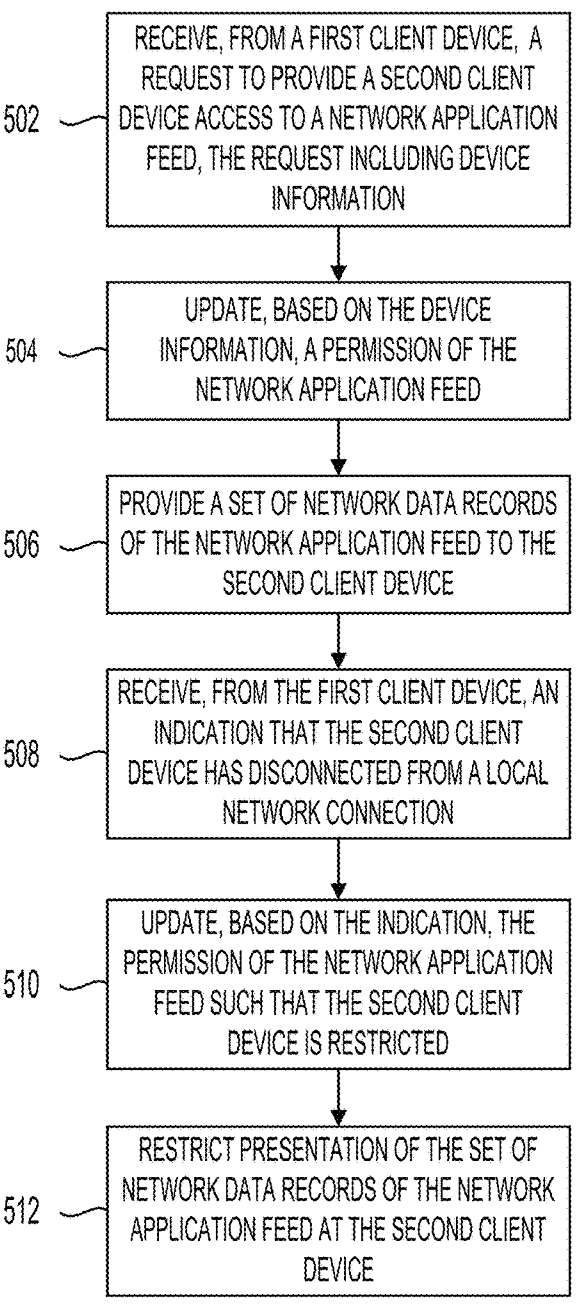
FIG. 5 illustrates a flow chart of a method for managing network application feed permissions based on device connectivity, in accordance with one or more implementations.

Referring now to FIG. 5, depicted is a flow chart of a method 500 for dynamically managing access permissions to a network application feed based on device connectivity status within a digital sports betting platform. The method 500 can be executed, performed, or otherwise carried out by any of the computing systems or devices described herein. In brief overview of the method 500, the method 500 can include receiving, from a first client device, a request to provide a second client device access to a network application feed, the request including device information (STEP 502), updating, based on the device information, a permission of the network application feed (STEP 504), providing a set of network data records of the network application feed to the second client device (STEP 506), receiving, from the first client device, an indication that the second client device has disconnected from a local network connection (STEP 508), updating, based on the indication, the permission of the network application feed such that the second client device is restricted (STEP 510), and restricting presentation of the set of network data records of the network application feed at the second client device (STEP 512).

The method 500 can include receiving, from a first client device (e.g., a client device 220), a request (e.g., a request 292) to provide a second client device (e.g., another client device 220) access to a network application feed (e.g., network application feed 290), the request including device information (STEP 502). The request can include device information of the second client device and an indication that the second client device has communicated via a local network connection (e.g., local communication network 212) with the first client device. In some implementations, the local network connection can include one or more of a WiFi connection, a Bluetooth connection, or an NFC connection, among others. The device information can include location information of the second client device, in some implementations. In some implementations, the request can be a manually-provided or selected request to provide the second client device access to the network application feed. For example, an operator of the first client device may select the second client device to provide access to the network application feed, and the first client device can transmit a request to provide the second client device access to the network application feed.

The method 500 can include updating, based on the device information, a permission (e.g., permission 265) of the network application feed (STEP 504). The permission of the network application feed can be updated such that the second client device is permitted to access the network application feed. In some implementations, the permission can be updated further based on the second client device being within a threshold distance of a location associated with the network application feed. In some implementations, the permission can be updated in response to determining, based on location information of the second client device, that the second client device is to be permitted or restricted from accessing the network application feed. In some implementations, the permission can be updated in response to a second indication that the second client device has reconnected to the local network connection.

The method 500 can include providing a set of network data records (e.g., data records 280) of the network application feed to the second client device (STEP 506). The set of network data records of the network application feed can be provided to the second client device for presentation in an application interface. The network data records may be associated with or include network data record parameters (e.g., data record parameters 282). In some implementations, the set of network data records can be updated in response to information indicative of an interaction corresponding to a client device associated with the network application feed. In some implementations, data indicative of a change in a status of a data record of the set of network data records can be provided to the second client device for presentation in the application interface.

The method 500 can include receiving, from the first client device, an indication that the second client device has disconnected from a local network connection (STEP 508). The indication can identify that the second client device has not communicated with the first client device via the local network connection within a predetermined time period. In some implementations, the indication that the second client device has disconnected from the local network connection can indicate that the second client device has not communicated via the local network connection for a predetermined time period. In some implementations, the first client device can monitor the connectivity status of the second client device by periodically checking for presence signals or heartbeat messages transmitted over the local network connection. When the first client device does not receive a presence signal from the second client device within the predetermined time period, the first client device can generate the indication of disconnection. In some implementations, the predetermined time period can be configurable based on group settings or session parameters. The indication can include metadata such as a timestamp of the last received communication, an identifier of the second client device, or a reason code for the disconnection event.

The method 500 can include updating, based on the indication, the permission of the network application feed such that the second client device is restricted (STEP 510). The permission of the network application feed can be updated such that the second client device is restricted from accessing the network application feed. In some implementations, the permission can be updated responsive to determining, based on location information of the second client device, that the second client device is to be restricted from accessing the network application feed. The permission update can include removing the second client device from an access control list or modifying a session token associated with the second client device to indicate restricted status. In some implementations, the data processing system can reference a geofence or proximity threshold to determine whether the second client device remains within an allowed area for group participation. The permission update can be logged in an audit record or event history for the network application feed. In some implementations, the data processing system can transmit a notification to the second client device or to other group members indicating the change in access status.

The method 500 can include restricting presentation of the set of network data records of the network application feed at the second client device (STEP 512). The presentation of the set of network data records of the network application feed can be restricted at the second client device in response to the second client device being restricted from accessing the network application feed. In some implementations, the restriction can include disabling or hiding access to the set of network data records, clearing any locally cached copies of the network data records, or terminating any active user interface session associated with the network application feed at the second client device. The data processing system can transmit a command or instruction to the second client device to enforce the restriction, such as by locking the user interface, displaying a message indicating loss of access, or redirecting the user to a default screen. In some implementations, the data processing system can require the second client device to re-authenticate or to request renewed permissions before regaining access to the network application feed. The restriction can be enforced immediately upon receipt of the updated permission status, or after a grace period specified by session configuration.

What is claimed is:

1. A system, comprising:

one or more processors coupled to non-transitory memory, the one or more processors configured to:
- maintain a plurality of network application feeds each corresponding to a respective client device, each network application feed of the plurality of network application feeds comprising a respective set of network data records;
- receive, from an application executing on a first client device corresponding to a first network application feed of the plurality of network application feeds, information indicative of a second client device requesting to access the first network application feed of the plurality of network application feeds, wherein the first client device receives the information in a local network communication from the second client device via a local network connection;
- update the first network application feed to include an identifier of a profile associated with the second client device based on the second client device being approved to access the first network application feed;
- provide, to the second client device for presentation in a first application interface, at least a portion of the respective set of network data records of the first network application feed;
- receive, from the first client device, a request to generate a data record associated with a first set of network parameters;
- update the respective set of network data records to include the data record and at least a subset of the first set of network parameters;
- provide, to the second client device for presentation in the first application interface, an indication of the data record and the subset of the first set of network parameters;
- determine that the second client device is no longer connected to the first client device via the local network connection; and
- restrict presentation, at the second client device, of subsequent updates to the first network application feed responsive to determining that the second client device is no longer connected to the first client device via the local network connection.

2. The system of claim 1, wherein the information comprises location information of the second client device, and wherein the one or more processors are further configured to:
- determine that the second client device is within a threshold distance of a location associated with the first network application feed; and
- update the first network application feed to include the identifier of the profile associated with the second client device in response to determining that the second client device is within the threshold distance of the location associated with the first network application feed.

3. The system of claim 1, wherein the information is indicative of a local wireless network communication transmitted from the second client device to the first client device.

4. The system of claim 1, wherein the one or more processors are further configured to:
- determine, based on a second signal from the first client device, that the second client device is no longer proximate to the first client device; and
- update the first network application feed to remove the identifier of the profile associated with the second client device.

5. The system of claim 1, wherein the data record is a first data record, and wherein the one or more processors are further configured to:

receive, from the first client device, a request to generate a second data record corresponding to the first data record, the second data record identifying a second set of network parameters; and update the respective set of network data records of the first network application feed to include the second data record and at least a portion of the second set of network parameters.

6. The system of claim 5, wherein the one or more processors are further configured to:

determine that the second client device is identified in the first network application feed; and provide, to the second client device for presentation in the first application interface, second data comprising at least a portion of the second set of network parameters of the second data record.

7. The system of claim 1, wherein the one or more processors are further configured to:

receive, from the first client device, a message identifying a notification type associated with the data record; and provide, to the second client device, data indicative of the notification type for presentation in connection with the data record via the first application interface.

8. The system of claim 1, wherein the one or more processors are further configured to:

detect a change in a status of the data record; and provide, to the first client device, data indicative of the change in the status of the data record for presentation in the second application interface.

9. The system of claim 1, wherein the one or more processors are further configured to:

receive, from the first client device, a request to establish the first network application feed; and establish first network application feed based at least on location information associated with the first client device.

10. The system of claim 1, wherein the one or more processors are further configured to:

identify, based on location information of the second client device, a subset of the plurality of network application feeds, wherein each network application feed of the subset is associated with a respective location within a threshold distance of the location information of the second client device; and provide, for presentation, the subset of the plurality of network application feeds.

11. A method, comprising:

maintaining, by one or more processors coupled to non-transitory memory, a plurality of network application feeds each corresponding to a respective client device, each network application feed of the plurality of network application feeds comprising a respective set of network data records;

receiving, by the one or more processors, from an application executing on a first client device corresponding to a first network application feed of the plurality of network application feeds, information indicative of a second client device requesting to access a first network application feed of the plurality of network application feeds, wherein the first client device receives the information in a local network communication from the second client device via a local network connection;

updating, by the one or more processors, the first network application feed to include an identifier of a profile associated with the second client device based on the second first client device being approved to access the first network application feed;

providing, by the one or more processors, to the second client device for presentation in a first application interface, at least a portion of the respective set of network data records of the first network application feed;

receiving, by the one or more processors, from the first client device, a request to generate a data record associated with a first set of network parameters;

updating, by the one or more processors, the respective set of network data records to include the data record and at least a subset of the first set of network parameters;

providing, by the one or more processors, to the first client device for presentation the first application interface, an indication of the data record and the subset of the first set of network parameters;

determining, by the one or more processors, that the second client device is no longer connected to the first client device via the local network connection; and restricting presentation, by the one or more processors, at the second client device, of subsequent updates to the first network application feed responsive to determining that the second client device is no longer connected to the first client device via the local network connection.

12. The method of claim 11, wherein the information comprises location information of the second client device, and further comprising:

determining, by the one or more processors, that the second client device is within a threshold distance of a location associated with the first network application feed; and updating, by the one or more processors, the first network application feed to include the identifier of the profile associated with the second client device in response to determining that the second client device is within the threshold distance of the location associated with the first network application feed.

13. The method of claim 11, wherein the information is indicative of a local wireless network communication transmitted from the second client device to the first client device.

14. The method of claim 11, further comprising:

determining, by the one or more processors, based on a second signal from the first client device, that the second client device is no longer proximate to the first client device; and updating, by the one or more processors, the first network application feed to remove the identifier of the profile associated with the second client device.

15. The method of claim 11, wherein the data record is a first data record, and further comprising:

receiving, by the one or more processors, from the first client device, a request to generate a second data record corresponding to the first data record, the second data record identifying a second set of network parameters; and updating, by the one or more processors, the respective set of network data records of the first network application feed to include the second data record and at least a portion of the second set of network parameters.

16. The method of claim 15, further comprising:

determining, by the one or more processors, that the second client device is identified in the first network application feed; and providing, by the one or more processors, to the second client device for presentation in the first application interface, second data comprising at least a portion of the second set of network parameters of the second data record.

17. The method of claim 11, further comprising:

receiving, by the one or more processors, from the first client device, a message identifying a notification type associated with the data record; and providing, by the one or more processors, to the second client device, data indicative of the notification type for presentation in connection with the data record via the first application interface.

18. The method of claim 11, further comprising:

detecting, by the one or more processors, a change in a status of the data record; and providing, by the one or more processors, to the first client device, data indicative of the change in the status of the data record for presentation in the second application interface.

19. The method of claim 11, further comprising:

receiving, by the one or more processors, from the first client device, a request to establish the first network application feed; and establishing, by the one or more processors, the first network application feed based at least on location information associated with the first client device.

20. The method of claim 11, further comprising:

identifying, by the one or more processors, based on location information of the second client device, a subset of the plurality of network application feeds, wherein each network application feed of the subset is associated with a respective location within a threshold distance of the location information of the second client device; and providing, by the one or more processors, for presentation, the subset of the plurality of network application feeds.

* * * * *